(12) United States Patent
Inoue et al.

(10) Patent No.: US 7,425,583 B2
(45) Date of Patent: Sep. 16, 2008

(54) ION EXCHANGER

(75) Inventors: Hiroshi Inoue, Tokyo (JP); Koji Yamanaka, Tokyo (JP); Makio Tamura, Tokyo (JP); Shusaku Yoshida, Tokyo (JP); Hideo Nakamura, Tokyo (JP)

(73) Assignee: Organo Corporation, Tokyo (JP)

(*) Notice: Subject to any disclaimer, the term of this patent is extended or adjusted under 35 U.S.C. 154(b) by 128 days.

(21) Appl. No.: 11/301,122

(22) Filed: Dec. 12, 2005

(65) Prior Publication Data

US 2006/0154997 A1    Jul. 13, 2006

Related U.S. Application Data

(62) Division of application No. 10/311,071, filed as application No. PCT/JP02/03326 on Apr. 3, 2002, now Pat. No. 7,026,364.

(30) Foreign Application Priority Data

Apr. 13, 2001  (JP) .............. 2001-116013
May 22, 2001  (JP) .............. 2001-152108
Sep. 18, 2001  (JP) .............. 2001-283554

(51) Int. Cl.
 *C08J 5/20*    (2006.01)
(52) U.S. Cl. .......... 521/25; 521/61; 521/142; 521/146; 521/149; 523/218
(58) Field of Classification Search ............ 521/25, 521/61, 142, 146, 149; 523/218
See application file for complete search history.

(56) References Cited

U.S. PATENT DOCUMENTS

| 5,624,875 | A | 4/1997 | Nakanishi et al. |
| 5,824,622 | A | 10/1998 | Harmer et al. |
| 6,811,684 | B2 * | 11/2004 | Mohr et al. .......... 208/213 |
| 7,033,472 | B2 | 4/2006 | Yamanaka et al. |
| 7,173,066 | B2 | 2/2007 | Inoue et al. |

OTHER PUBLICATIONS

Supplementary European search report for European patent application No. 02714422.9, PCT/JP0203326, mailed Dec. 14, 2005, 3 pages.

Communication pursuant to Article 96(2) EPC, for European patent application No. 02 714 422.9, mailed Feb. 13, 2007, 5 pages.

U.S. Patent and Trademark Office Notice of Allowance for U.S. Appl. No. 11/301,053, mailed Sep. 19, 2006, 8 pages.

* cited by examiner

*Primary Examiner*—Helen L. Pezzuto
(74) *Attorney, Agent, or Firm*—Osha Liang LLP

(57) ABSTRACT

A porous ion exchanger includes an open cell structure including interconnected macropores and mesopores whose average diameter is in a range of 1 to 1000 μm existing on walls of the macropores. Moreover, a total pore volume is in a range of 1 to 50 ml/g, ion exchange groups are uniformly distributed, and an ion exchange capacity is not less than 0.5 mg equivalent/g of dry porous ion exchanger. The porous ion exchanger can be used as an ion exchanger filled into a deionization module of an electrodeionization water purification device, solid acid catalyst, adsorbent, and filler for chromatography.

5 Claims, 9 Drawing Sheets

ION EXCHANGER

CROSS-REFERENCE TO RELATED APPLICATIONS

This is a divisional application of U.S. patent application Ser. No. 10/311,071 filed on Dec. 13, 2002, now U.S. Pat. No. 7,026,364, which is a National Stage Application of PCT Application No. PCT/JP02/03326, filed on Apr. 3, 2002.

TECHNICAL FIELD

The present invention relates to an ion exchanger to be used for the electrodeionization water purification device, and an ion exchanger suitable for a solid acid catalyst and chromatography filling material.

BACKGROUND ART

In the electrodeionization water purification device heretofore put to practical use, basically a mixture ion exchange resin of an anionic exchange resin and cationic exchange resin is filled as an ion exchanger into a gap formed by cation and anion exchange membranes to form a depletion chamber, water to be treated is passed through the ion exchange resins, a direct current is allowed to act in a right angle direction with respect to the water to be treated via both the ion exchange membranes, and ions in the water to be treated are electrically discharged into concentrate flowing outside both the ion exchange membranes to produce deionized water. Since impurity ions in the water to be treated are electrically removed by this operation, the deionized water can continuously be obtained without regenerating the filled ion exchange resins by chemical.

Since the regeneration by the chemical is unnecessary in the electrodeionization water purification device, the running cost is determined by power consumption. The power consumption excluding rectification loss in converting an alternate current into a direct current in the electrodeionization water purification device is represented by direct current between both electrodes×voltage. Here, the direct current is determined by the amount of ions contained in the water to be treated, type of the ions, and required treated water quality. That is, in the electrodeionization water purification device, it is necessary to continuously discharge the ions captured by the ion exchange resins in the depletion chamber to the concentrate side by electric migration. A given or more current necessary for the migration of the ions is essential for the electrodeionization water purification device to normally exhibit its performance, therefore, in an ordinary case, in the electrodeionization water purification device, a constant-current operation is performed to hold a constant current value which exceeds a minimum necessary current value in operation conditions. On the other hand, the voltage is determined by electric resistance between the electrodes, and depends largely on capabilities of the ion exchange membranes and ion exchange resins used in the electrodeionization water purification device. That is, the electric resistance is a total sum of electric resistances by an electrode chamber disposed between the electrodes, concentrate chamber, and depletion chamber. When a distance between the electrodes and operation temperature are set to be constant, the electric resistance is influenced by the concentration and type of ions contained in electrode water and concentrate, type of ion exchange membranes and ion exchange resins, type of counter ions of an ion exchange group of the ion exchange resin, further filling method (single or mixed bed), and further contact resistance in an interface of all these electric resistance constituting elements. For the electric resistance constituting elements, the concentration and type of the ions contained in the electrode water and concentrate are determined by the quality of the water to be treated and the required treated water quality, and other elements depend on the capability and use method of the ion exchanger for use in the electrodeionization water purification device.

However, in the conventional electrodeionization water purification device, for the ion exchange resin filled into a electrodeionization module, a general-purpose product widely available is used as such. Minimization of the electric resistance value for reducing the running cost of the electrodeionization water purification device has not been taken into consideration in selecting the ion exchange resins. That is, in the conventional electrodeionization water purification device, as the ion exchange resin, in general, a spherical resin having a diameter of about 0.2 to 0.5 mm is filled which is obtained by introducing into a copolymer of styrene and divinylbenzene (DVB), sulfonic acid group ($R-SO_3^-H^+$) as a cationic exchange group and a quaternary ammonium base ($R-N^+R_1R_2R_3$) as an anionic exchange group. In this case, the current transfer in ion exchange resin particles, that is, the transfer of electrons and ions transmitted with low resistance via the ion exchange groups which uniformly and densely exist in a polymer gel. On the other hand, in an ion exchange resin particle interface, during movement of the ions and electrons, for the ions, a migration distance of the ions in water is long. For the electrons, an electron transmission path via hydrogen bond among water molecules is long. Moreover, since a contact area of the particles is small because of the spherical shape, a flow of ions is concentrated on a contact portion. This inhibits the current transmission, that is, causes the electric resistance, and this is a major factor of the electric resistance ascribed to the ion exchange resin.

Moreover, since the general-purpose ion exchange resin is filled into the depletion chamber in the conventional electrodeionization water purification device, considerable time and labor are necessary for the manufacture of the device. Especially, to assemble an electrodeionization module, a plurality of sandwiched ends are laminated/bonded using an adhesive, while wetted ion exchange resins have to be uniformly filled. The production requires considerable skills and is not easily automated. Moreover, even when the adhesive is not used, it is difficult to handle the wetted ion exchange resin.

To solve these problems, for example, there have been proposed: a porous ion exchanger which has a porous structure using binder polymer to bond the ion exchange resin and which holds specific water permeability (Japanese Patent Application Laid-Open Nos. 1996-252579, 1998-192716); a depletion chamber structure in which an adhesive is used to integrally bond/form anion and cation exchangers and which obviates necessity of a frame including a specific structure of a liquid passing portion and permeate seal-up portion or an ion exchange membrane (Japanese Patent Application Laid-Open No. 2000-218137); and a simplified structure in which a porous structure is formed in surface portions of cationic and anionic exchange membranes, the cationic exchange membrane is brought into contact with the anionic exchange membrane, and a porous portion of the porous structure is used as a channel for circulating the water to be treated (Japanese Patent Application Laid-Open No. 1999-192491).

When the porous structure described in the Japanese Patent Application Laid-Open No. 1996-252579 is used as a filler of the electrodeionization module, the problem in manufacturing the device is solved concerning the uniform filling of the granular ion exchange resin. However, in the porous structure, the granular ion exchange resins heretofore filled into the electrodeionization module as such are bonded using the binder polymer to form the porous structure. Furthermore, depending on the circumstances, a new step of introducing the ion exchange group also into a binder polymer portion is necessary in manufacturing the porous structure. Although a device assembly step is simplified, the manufacturing of the depletion chamber filler is complicated. Furthermore, it cannot be said that the high electric resistance resulting from the filling of the granular ion exchange resins is sufficiently improved in the porous structure. That is, in the porous structures, the ion exchange group does not exist in the binder polymer portion. Even when the group exists, a matrix material of the binder polymer and the structure of the ion exchange group are different from those of the ion exchange resin portion. Additionally, presence density of the ion exchange groups in the binder polymer is lower than that of the ion exchange resin portion, and it is difficult to form a homogeneous ion exchanger as a whole. Therefore, the problem of nonuniformity of ion or electron movement in the filling layer remains to be unsolved, and it cannot be said that the reduction of the electric resistance of the ion exchanger filling layer and efficient discharge of the captured ions into a concentrate chamber are sufficient.

As described above, for any one of the conventional porous ion exchangers, the granular ion exchange resins are bonded by the binder polymer to form the integral structure, or the porous structure is not concretely described. Moreover, an open cell structure is not disclosed which is manufactured by highly dispersed phase emulsifying polymerization and which includes interconnected macropores and mesopores as a water channel existing on the macropores. In Japanese Patent Publication No. 1992-49563, a porous polymer is disclosed which is manufactured by the highly dispersed phase emulsifying polymerization and which has enhanced adsorption capacity for aqueous or organic acids. However, the porous polymer has an excessively high swelling or liquid absorption capability and is not suitable for producing the deionized water.

Moreover, as a solid acid catalyst, a silica alumina compound such as zeolite, heteropoly acid, cation exchange resin, and the like have heretofore been known. When the catalysts excluding the cation exchange resin are used in a water-containing system, activity is remarkably lowered or the catalysts are dissolved and cannot be used. Therefore, most of the solid acid catalysts for use in the water-containing system are the cationic exchange resins.

It is known that a particle diameter of the cation exchange resin may be reduced in order to enhance the catalyst activity of the cation exchange resin. However, to fill the cationic exchange resin into a reaction tower and continuously supply a liquid to be treated, when a particle diameter is reduced, a transmission resistance of the liquid to be treated increases. While large catalyst activity is maintained, a treatment amount cannot be raised. Moreover, as a method of further efficiently allowing the reaction to proceed, a method using reaction distillation is known. However, when the conventional granular cationic exchange resin is used as the solid acid catalyst for reaction distillation, the filling of the cationic exchange resin into a distillation tower remarkably blocks transmission property of a gas or liquid including a raw material or reaction product. Therefore, it has been difficult to apply the resin to the reaction distillation.

Therefore, as a method of solving this shortcoming, there have been proposed: a method of granulating the cation exchange resin (Japanese Patent Publication No. 1987-42658); a method of filling an ion exchange fiber (Japanese Patent Application Laid-Open No. 1982-7259); and a method of introducing the ion exchange group onto a base substance manufactured by graft polymerization to have a sufficient void (Japanese Patent No. 2846975).

However, the method of granulating the cation exchange resin has a disadvantage that improvement effect of the transmission property of the gas or liquid is not sufficient and reaction speed drops because of granulation. Moreover, in the method of filling the ion exchange fiber, the reaction speed does not drop, but the fiber and fiber processed materials such as woven cloth are excessively soft, have insufficient strength, and therefore have a disadvantage that they absorb reaction liquid and are deformed and hinder the transmission of gas. For the method of introducing the ion exchange group onto the base substance manufactured by the graft polymerization to have sufficient void, an improvement effect is recognized as a method of compensating for mechanical strength shortage which is the disadvantage of the method of filling the ion exchange fiber. However, the amount of ion exchange groups which can be introduced by radiation graft polymerization is limited. Therefore, there is a disadvantage that an ion exchange capacity is not adequate, and the reaction rate is restricted. As described above, in the conventional technique, the ion exchangers having various shapes as the solid acid catalysts have been proposed. However, although sufficiently high catalyst activity is maintained, rapid improvement of transmission property for the gas or liquid including the raw material or reaction product is not achieved.

Moreover, as the porous structure which includes the open cell structure including the interconnected macropores and mesopores existing on the walls of the macropores and which further includes the micropores existing on the inner walls of the open cell, an inorganic porous structure constituted of silica, etc. is known (U.S. Pat. No. 5,624,875). Furthermore, active application development of the inorganic porous structure as the filler for chromatography has been performed. However, since the inorganic porous structure is hydrophilic, a laborious operation involving cost increase, such as a hydrophobic treatment of the surface, has been necessary for using the structure as adsorbent. Additionally, when the inorganic porous structure is held in water for a long time, a silicate ion generated by hydrolysis of silica is eluted into water. Therefore, it has been impossible to use the structure as the ion exchanger for manufacturing pure water or ultrapure water. On the other hand, it has been reported that with the use of the inorganic porous structure as the filler for chromatography, the capability can remarkably be enhanced as compared with the use of the conventional granular filler. However, since the mesopore has a diameter of 50 μm at maximum in the manufacturing method, there is a restriction during the treatment of a large flow rate at low pressure. Moreover, the micropore also has a diameter of about 100 nm at maximum. Therefore, in separation of a polymer compound such as protein and enzyme, there is a problem that a polymer amount component is insufficiently fractionated.

On the other hand, as an organic porous structure including continuous pores, a porous structure including a particle aggregation structure is disclosed in F. Svec, Science, 273, 205 to 211 (1996), and the like. However, since the porous structure obtained in this method includes the particle aggregation structure, a pore volume is small, the mesopore cannot be enlarged, and therefore there has been the restriction during the treatment of the large flow rate at the low pressure. Moreover, since the presence of micropores is unclear and specific surface area is small, adsorption capacity is low with the use as the adsorbent, and it has been difficult to fractionate polymer compounds by molecular weight when the organic porous structure is used as the filler for chromatography.

DISCLOSURE OF THE INVENTION

An object of the present invention is to provide a porous ion exchanger which includes a specific open cell structure and which has remarkably large pore volumes and specific surface areas.

Moreover, another object of the present invention is to provide a deionization module which is easily assembled and which includes a simple structure.

Furthermore, another object of the present invention is to provide a power-saving electrodeionization water purification device in which the voltage required for its operation is lowered and its power consumption can be reduced.

Additionally, another object of the present invention is to provide a solid acid catalyst constituted of a porous ion exchanger including a specific structure in which sufficiently high catalyst activity is maintained and the property of transmitting gas or liquid including a raw material or reaction product or a mixture of these is remarkably improved.

Moreover, another object of the present invention is to provide adsorbents superior in adsorption capacity or adsorption rate, ion exchangers superior in durability against swelling or contraction, organic porous materials which can be used as fillers for chromatography superior in fractionation of high-molecular weight compounds and which have remarkably large specific surface areas, manufacturing method thereof, and organic porous ion exchanger.

As a result of intensive studies, the present inventors have found that, for example, porous materials including a specific open cell structure obtained by polymerizing a water-in-oil type emulsion holds strength, has remarkably large pore volumes and specific surface areas, and is therefore preferable for the ion exchanger of the electrodeionization water purification device, and have completed the present invention.

That is, according to the present invention, there is provided porous ion exchangers which include an open cell structure including interconnected macropores and mesopores having an average diameter of 1 to 1000 μm in existing on the walls of the macropores and have a total pore volume of 1 to 50 ml/g and in which ion exchange groups are uniformly distributed and an ion exchange capacity is not less than 0.5 mg equivalent/g of dry porous ion exchanger. These porous ion exchangers are the ion exchangers which include a specific open cell structure and whose structure is totally different from the conventional particle aggregation porous structure and is a novel one. Especially, while the porous structure holds strength, the pore volume and specific surface area of the structure can remarkably be enlarged.

Moreover, according to the present invention, there is provided a deionization module for use in an electrodeionization water purification device, comprising the above-mentioned porous ion exchange filled into an internal space formed by a cationic exchange membrane disposed so as to seal up one side of a frame and an anionic exchange membrane disposed so as to seal up the other side of the frame. According to the deionization module, the porous ion exchanger filled in the space between the ion exchange membranes can be formed, for example, in a flat plate shape or cylindrical shape. Moreover, a polymer material which is easily cut can be used as the frame, and therefore a simple structure which is easily assembled can be obtained.

Furthermore, according to the present invention, there is provided an electrodeionization water purification device including the deionization module. This electrodeionization water purification device can be constituted as a power saving type in which the voltage required for its operation is lowered and its power consumption can be reduced.

Moreover, as a result of intensive studies, the present inventors have found that the porous ion exchanger is a solid acid catalyst, and have completed the present invention.

That is, according to the present invention, there is provided a solid acid catalyst comprising a porous ion exchanger which includes an open cell structure including interconnected macropores and mesopores having an average diameter of 1 to 1,000 μm existing on the walls of the macropores and in which a total pore volume is in a range of 1 to 50 ml/g, cation exchange groups are uniformly distributed, and a cation exchange capacity is not less than 0.5 mg equivalent/g of dry porous ion exchanger.

Furthermore, as a result of intensive studies, the present inventors have found that an organic porous material obtained by polymerizing an oil soluble monomer not containing any ion exchange group, a specific precipitant, a surface-active agent, and water-in-oil type emulsion holds strength and has remarkably large pore volume and specific surface area, and that the organic porous material act as an adsorbent superior in adsorption capacity and rate, an ion exchanger capable of being used at low pressure and high flow rate and superior in durability against swelling and contraction, or a filler for chromatography superior in the characteristics of fractionating a high-molecular-weight compound, and have completed the present invention.

That is, according to the present invention, there is provided an organic porous material comprising an open cell structure including interconnected macropores and mesopores having an average diameter of 1 to 1,000 μm existing on the walls of the macropores, and further micropores as non-continuous pores having an average pore diameter of 5 to 800 nm existing on the an inner wall of the cell structure formed by the macropores and mesopores. This organic porous material includes a specific open cell structure, a novel structure totally different from the conventional particle aggregation type porous material. Moreover, since the organic porous material can include relatively large mesopores and non-continuous micropores while holding the strength, the pore volume and specific surface area can remarkably be enlarged. Therefore, the material can act as an absorbent superior in adsorption capacity or rate, an ion exchanger capable of being treated at the low pressure and high flow rate and superior in durability against the swelling and contraction, and a filler for chromatography superior in the characteristics of fractionating high-molecular-weight compounds.

Moreover, in the present invention, an oil-soluble monomer not containing any ion exchange group, a precipitant which is a poor solvent against a polymer obtained by polymerizing the oil-soluble monomer and by which the oil-soluble monomer is dissolved, a surface-active agent, and a water-containing water-in-oil type emulsion are polymerized, and subsequently unreacted products are removed. Thereafter, the polymer is dried to manufacture the organic porous material. By this constitution, the organic porous material can easily and securely be manufactured.

Furthermore, according to the present invention, there is provided an organic porous ion exchanger comprising an open cell structure including interconnected macropores and mesopores having an average diameter of 1 to 1000 μm existing on the walls of the macropores, and further non-continuous micropores having an average pore diameter of 5 to 800 nm existing on the inner walls of the cell structure formed by the macropores and mesopores, wherein an ion exchange capacity is not less than 0.5 mg equivalent/g of dry porous ion exchanger. When the organic porous ion exchanger is filled, for example, into a space between ion exchange membranes of the electrodeionization water purification device to constitute a depletion chamber, the durability against the swelling and contraction is superior, and water to be treated can be passed at the low pressure and high flow rate.

BEST MODE FOR CARRYING OUT THE INVENTION

Figure 1:
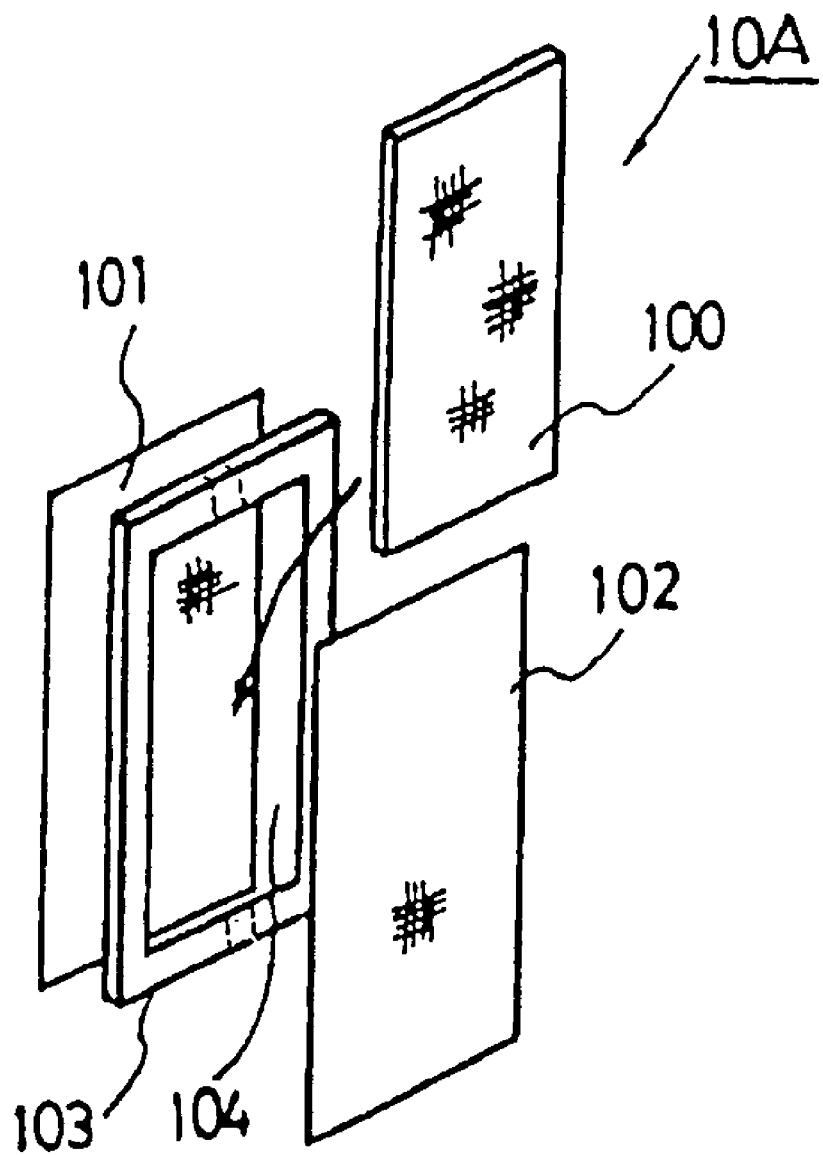
FIG. 1 is a schematic diagram showing a deionization module of the present invention.

A basic structure of a porous ion exchanger of the present invention is an open cell structure which includes interconnected macropores and mesopores having an average diameter of 1 to 1000 µm, preferably 10 to 100 µm existing on the walls of the macropores. That is, in the open cell structure, usually the macropores having an average diameter of 2 to 5000 µm overlap with one another, overlapped portions include mesopores as common orifices, and most of the macropores have an open pore structure. When water is passed through the open pore structure, a channel is formed in the cell structure formed by the macropores and mesopores. For the overlap of the macropores, there are one to 12 portions per macropore, three to ten portions at most. When the average diameter of the mesopores is less than 1 µm, and when the structure is used for water treatment, pressure loss at a water passing time increases. On the other hand, when the average diameter of mesopores is larger than 1000 µm, desalination efficiency undesirably drops. When the structure of the porous ion exchanger is formed as the above-described open cell structure, macropore and mesopore groups can uniformly be formed. Moreover, as compared with a particle aggregation type porous material described in Japanese Patent Application Laid-Open No. 1996-252579, pore volume and specific surface area can remarkably be enlarged. Therefore, when this is used as the ion exchanger of an electrodeionization water purification device, the deionization efficiency is remarkably enhanced, and the structure is very advantageous.

Moreover, the porous ion exchanger has a total pore volume of 1 to 50 mL/g. When the total pore volume is less than 1 mL/g, the water flux rate per unit sectional area decreases, and the treatment capacity undesirably drops. On the other hand, when the total pore volume exceeds 50 mL/g, for example, a ratio occupied by a skeletal portion such as polymer drops, and strength of the porous material remarkably unfavorably drops. The total pore volume of the conventional porous ion exchanger is in a range of 0.1 to 0.9 mL/g at most. Therefore, it is possible to use a material which has a high pore volume exceeding this range and having a non-conventional range of 1 to 50 mL/g, and large specific surface area. Furthermore, when the porous ion exchanger has a thickness of 10 mm, the water permeation rate is preferably in a range of 100 to 100,000 L/minute·m$^2$·MPa. When the water permeation rate and void content are within the range, and when this material is used as the ion exchanger of the electrodeionization water purification device, requirements for both the strength and deionization efficiency of the porous material can preferably be satisfied. For a material of the skeletal portion forming the open cell structure, an organic polymer material including a crosslinking structure is used, and the crosslinking structure unit should preferably account for in a range of 10 to 90 mol % with respect to the total polymer material. When the crosslinking structure unit is less than 10 mol %, the mechanical strength unfavorably weakens. On the other hand, when the unit exceeds 90 mol %, it is difficult to introduce ion exchange groups, and the ion exchange capacity unfavorably drops. The type of the polymer material is not especially limited, and examples of the material include: styrene-based polymers such as polystyrene, poly(α-methylstyrene), and polyvinylbenzylchloride; polyolefins such as polyethylene and polypropylene; poly(olefin halide) such as polyvinylchloride, and polytetrafluoroethylene; nitrile-based polymers such as polyacrylonitrile; (meth)acryl-based polymers such as polymethyl methacrylate and polyacrylic ethyl; styrene-divinylbenzene copolymer; vinylbenzyl chloride-divinylbenzene copolymer; and the like. The polymer may either homo polymer obtained by polymerizing single monomer, or copolymer obtained by polymerizing a plurality of monomers. Moreover, two or more polymers may also be blended. Among these organic polymer materials, in view of the introduction of the ion exchange groups and high mechanical strength, the styrene-divinylbenzene copolymer or vinylbenzylchloride-divinylbenzene copolymer is an example of a preferable material. The open cell structure of the porous ion exchanger of the present invention can relatively easily be observed with an SEM photograph.

In the porous ion exchanger of the present invention, the ion exchange groups are uniformly distributed, the ion exchange capacity is not less than 0.5 mg equivalent/g of dry porous material, preferably not less than 2.0 mg equivalent/g of dry porous material. When the ion exchange capacity is less than 0.5 mg equivalent/g of dry porous material, the deionization efficiency unfavorably drops. Moreover, when the distribution of the ion exchange groups is nonuniform, ion or electron movement into the porous ion exchanger becomes nonuniform, and it is unfavorably impossible to reduce electric resistance or efficiently discharge captured ions into a concentrate chamber. It is to be noted that "the ion exchange groups are uniformly distributed" means a uniform distribution of the ion exchange groups of at least a µm order. The distributed circumstance of ion exchange groups can relatively easily be confirmed using EPMA, SIMS, and the like. Examples of the ion exchange group to be introduced into the porous ion exchanger include: cationic exchange groups such as a carboxylic acid group, iminodiacetic acid group, sulfonic acid group, phosphoric acid group, and phosphoric ester group; anionic exchange groups such as a quaternary ammonium group, tertiary amino group, secondary amino group, primary amino group, polyethylene imine, tertiary sulfonium group, and phosphonium group; and amphoteric ion-exchange groups such as betaine and sulfobetaine.

The porous ion exchanger of the present invention includes the open cell structure in which macropore groups and mesopore groups of specific orifices generated by overlapped macropores uniformly exist, and includes a novel structure far different from that of the conventional particle aggregation type porous material. While the strength of the porous ion exchanger is held, the pore volume and specific surface area can remarkably be enlarged.

The manufacturing method of the porous ion exchanger is not especially limited, and examples of the method include: a method of forming components containing the ion exchange groups into the porous material in one stage; and a method of forming the porous material by the components not containing the ion exchange groups and thereafter introducing the ion exchange groups. One example of the manufacturing method of the porous ion exchanger will next be described. That is, the method comprises: mixing an oil-soluble monomer not containing the ion exchange group, surface-active agent, water, and polymerization initiator if necessary to obtain the water-in-oil type emulsion; and polymerizing the emulsion to manufacture the porous ion exchanger.

The oil-soluble monomer not containing the ion exchange group is an oleophic monomer which does not contain the ion exchange groups such as a carboxylic acid group, sulfonic acid group, and quaternary ammonium group and which has low solubility with respect to water. Concrete examples of these monomers include styrene, α-methylstyrene, vinyltoluene, vinylbenzylchloride, divinylbenzene, ethylene, propylene, isobutene, butadiene, isoprene, chloroprene, chloroethene, vinyl bromide, vinylidene chloride, tetrafluoroethylene, acrylonitrile, methacrylonitrile, vinyl acetate, methyl acrylate, ethyl acrylate, butyl acrylate, 2-ethylhexyl acrylate, trimethylolpropane triacrylate, butanediol diacrylate, methyl methacrylate, ethyl methacrylate, propels methacrylate, butyl methacrylate, 2-ethylhexyl methacrylate, cyclohexyl methacrylate, benzyl methacrylate, glycidyl methacrylate, and ethylene glycol dimethacrylate. These monomers can be used alone or as a combination of two or more thereof. Additionally, in the present invention, crosslinking monomers such as divinylbenzene and ethylene glycol dimethacrylate are selected as at least one component of the oil-soluble monomer, and the content is set to a range of 10 to 90 mol %, preferably 12 to 80 mol % in the total oil-soluble monomer. This is preferable in that a necessary mechanical strength is obtained in introducing a large amount of ion exchange groups in a subsequent step.

The surface-active agent is not especially limited as long as the water-in-oil type (W/O) emulsion can be formed in mixing the oil-soluble monomer not containing the ion exchange group and water. There can be used: non-ion surface-active agents such as sorbitan monooleate, sorbitan monolaurate, sorbitan monopalmitate, sorbitan monostearate, sorbitan trioleate, polyoxyethylene nonylphenyl ether, polyoxyethylene stearyl ether, and polyoxyethylene sorbitan monooleate; anionic surface-active agents such as potassium oleate, sodium dodecylbenzenesulfonate, and dioctyl sodium sulfosuccinate; cationic surface-active agents such as distearyl dimethyl ammonium chloride; and amphoteric surface-active agents such as lauryl dimethyl betaine. These surface-active agents can be used alone or as a combination of two or more thereof. It is to be noted that the water-in-oil type emulsion is an emulsion including a continuous phase as an oil phase and water droplets are dispersed in the phase. The addition amount of the surface-active agent largely should vary with the type of the oil-soluble monomer and the size of emulsion particles (macropores) desired, and cannot therefore categorically be determined. However, the amount can be selected in a range of about 2 to 70% with respect to the total amount of the oil-soluble monomer and surface-active agent. Moreover, to control the cell shape and size of the porous ion exchanger, which is not necessarily essential, alcohol such as methanol and stearyl alcohol; carboxylic acid such as stearic acid; and carbon hydride such as octane and dodecane can coexist in the system.

As the polymerization initiator, a compound which generates radicals by heat and irradiation is preferably used. The polymerization initiator may be water or oil soluble, and examples of the initiator include azobisisobutyronitrile, azobiscyclohexanenitrile, azobiscyclohexanecarbonitrile, benzoyl peroxide, potassium persulfate, ammonium persulfate, hydrogen peroxide-iron chloride, sodium persulfate-acid sulphite sodium, tetramethyl thiram disulfide, and the like. Additionally, depending on circumstances, the polymerization proceeds only with heating or irradiation without adding the polymerization initiator in some system, and it is unnecessary to add the polymerization initiator in the system.

The method of mixing the oil-soluble monomer not containing the ion exchange group, surface-active agent, water, and polymerization initiator to form the water-in-oil emulsion is not especially limited. As the method, a method of mixing the respective components in a batch all at once, a method of separately uniformly dissolving oil-soluble components such as the oil-soluble monomer, surface-active agent, and oil-soluble polymerization initiator, and water-soluble components such as water and water-soluble polymerization initiator and thereafter mixing the respective components, and the like can be used. The device for forming the emulsion is not especially limited, a usual mixer, homogenizer, high-pressure homogenizer, and the like can be used, and an appropriate device for obtaining a target emulsion particle diameter may be selected. Moreover, mixing conditions are not especially limited, and an agitation rotation number or time can arbitrarily be set so that the target emulsion particle diameter can be obtained.

With regard to the conditions for polymerizing the water-in-oil type emulsion thus obtained, various conditions can be selected in accordance with the type of the monomer, and polymerization initiator system. For example, when the polymerization initiators such as asobisisobutyronitrile, benzoyl peroxide, and potassium persulfate are used, the emulsion may be heated/polymerized at 30 to 100° C. for one to 48 hours in a sealed container under an inert atmosphere. When the initiators such as hydrogen peroxide-iron chloride and sodium persulfate-acid sulphite sodium are used, the emulsion may be polymerized at 0 to 30° C. for one to 48 hours in the sealed container under the inert atmosphere. After the polymerization ends, the content of the container is taken out, Soxhlet extraction is performed using solvents such as isopropanol, and unreacted monomer and remaining surface-active agent are removed to obtain the porous material.

The method of introducing the ion exchange group into the porous material obtained by the polymerization step is not especially limited, and known methods such as polymer reaction and graft polymerization can be used. Examples of a method of introducing the sulfonic acid group include: a method of using chlorosulfuric acid, concentrated sulfuric acid, or fuming sulfuric acid to sulfonate the material, when the porous material is a styrene-divinyl benzene copolymer; a method of introducing a radical initiation group or chain transfer group into the porous material and graft-polymerizing sodium styrenesulfonate or acrylamide-2-methylpropane sulfonic acid; a method of similarly graft-polymerizing glycidyl methacrylate and subsequently introducing the sulfonic acid group by functional group conversion; and the like. Moreover, examples of a method of introducing the quaternary ammonium group include: a method of introducing a chloromethyl group by chloromethyl methyl ether, thereafter reacting the group with tertiary amine, and introducing the group, when the porous material is the styrene-divinylbenzene copolymer; a method of manufacturing the porous material by copolymerization of chloromethyl styrene and divinyl benzene, reacting the group with tertiary amine, and introducing the group; a method of introducing the radical initiation group or chain transfer group into the porous material to graft-polymerize N,N,N-trimethylammonium ethylacrylate or N,N,N-trimethylammonium propels acrylamide; a method of similarly graft-polymerizing glycidyl methacrylate and subsequently introducing the quarternary ammonium group by the functional group conversion; and the like. Moreover, examples of a method of introducing betaine include: a method of introducing tertiary amine into the porous material as described above, and subsequently reacting and introducing monoiodoacetic acid; and the like. It is to be noted that examples of the ion exchange group to be introduced include: the cationic exchange groups such as the carboxylic acid group, iminodiacetic acid group, sulfonic acid group, phosphoric acid group, and phosphoric ester group; anionic exchange groups such as the quaternary ammonium group, tertiary amino group, secondary amino group, primary amino group, polyethylene imine, tertiary sulfonium group, and phosphonium group; and amphoteric ion-exchange groups such as betaine and sulfobetaine.

Figure 2:
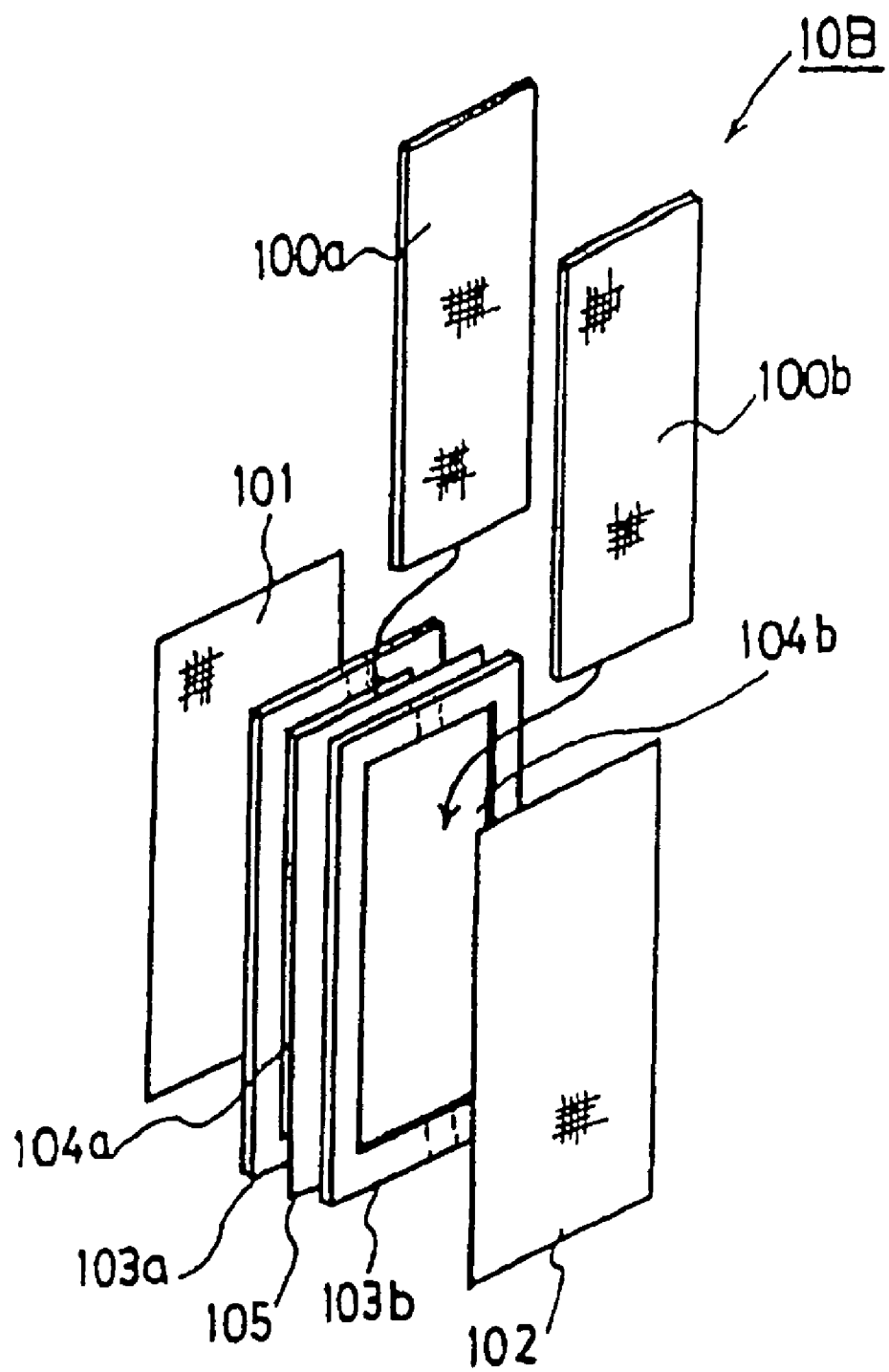
FIG. 2 is a schematic diagram showing another deionization module of the present invention.

As a deionization module for use in the electrodeionization water purification device according to the present invention, for example, as shown in FIG. 1, there is a deionization module 10A in which a porous ion exchanger 100 formed in a plate shape is filled into an internal space 104 formed by a cationic exchange membrane 101 disposed so as to seal up one side of a frame 103 and an anionic exchange membrane 102 disposed to seal up the other side. As shown in FIG. 2, there is another deionization module 10B in which a porous ion exchanger 100a formed in the plate shape is filled into a first internal space 104a formed by the cationic exchange membrane 101 disposed so as to seal up one side of a frame 103a and an intermediate ion exchange membrane 105 sealed/attached between frames 103a and 103b, and further a porous ion exchanger 100b formed in the plate shape is filled into a second internal space 104b formed by the intermediate ion exchange membrane 105 and anionic exchange membrane 102 disposed to seal up the other side of the frame 103b. That is, a mode for filling the porous ion exchanger of the present invention into the deionization module is not especially limited as long as an object to produce deionized water is achieved. A filling mode can be used in which the ion exchanger in the conventional deionization module is replaced with the porous ion exchanger of the present invention. Moreover, in the electrodeionization module of the present invention, without using the frame, the ion exchange membrane and porous ion exchanger can be bonded/to form the electrodeionization module, and an assembly operation of the electrodeionization water purification device can be simplified.

It is to be noted that as shown by broken lines in the drawings, inflow and outflow orifices are disposed in upper and lower sides of the frames 103, 103a, 103b, and water can be circulated through the internal spaces of the frames 103, 103a, 103b.

The electrodeionization water purification device of the present invention is not especially limited, as long as the device including the electrodeionization module electrically discharges impurity ions captured in the porous ion exchanger and produces deionized water, and examples of the device include flat-plate shaped, cylindrical, and spiral electrodeionization water purification devices. As the flat plate shaped electrodeionization water purification device, for example, a usable device includes: a depletion chamber in which the porous ion exchanger is filled between the cation and anion exchange membranes; concentrate chambers disposed on opposite sides of the depletion chamber via the cation and anion exchange membranes; and an anode and a cathode disposed on the opposite sides. Another usable device includes: a depletion chamber in which porous ion exchangers are filled into a first small depletion chamber formed by a cation exchange membrane, and an intermediate ion exchange film disposed between the cation exchange membrane and an anion exchange membranes, and a second small depletion chamber formed by the intermediate ion exchange membrane and the anion exchange membrane; concentrate chambers disposed on opposite sides of the depletion chamber via the cationic and anionic exchange membranes; and an anode and a cathode disposed on the opposite sides.

Figure 3:
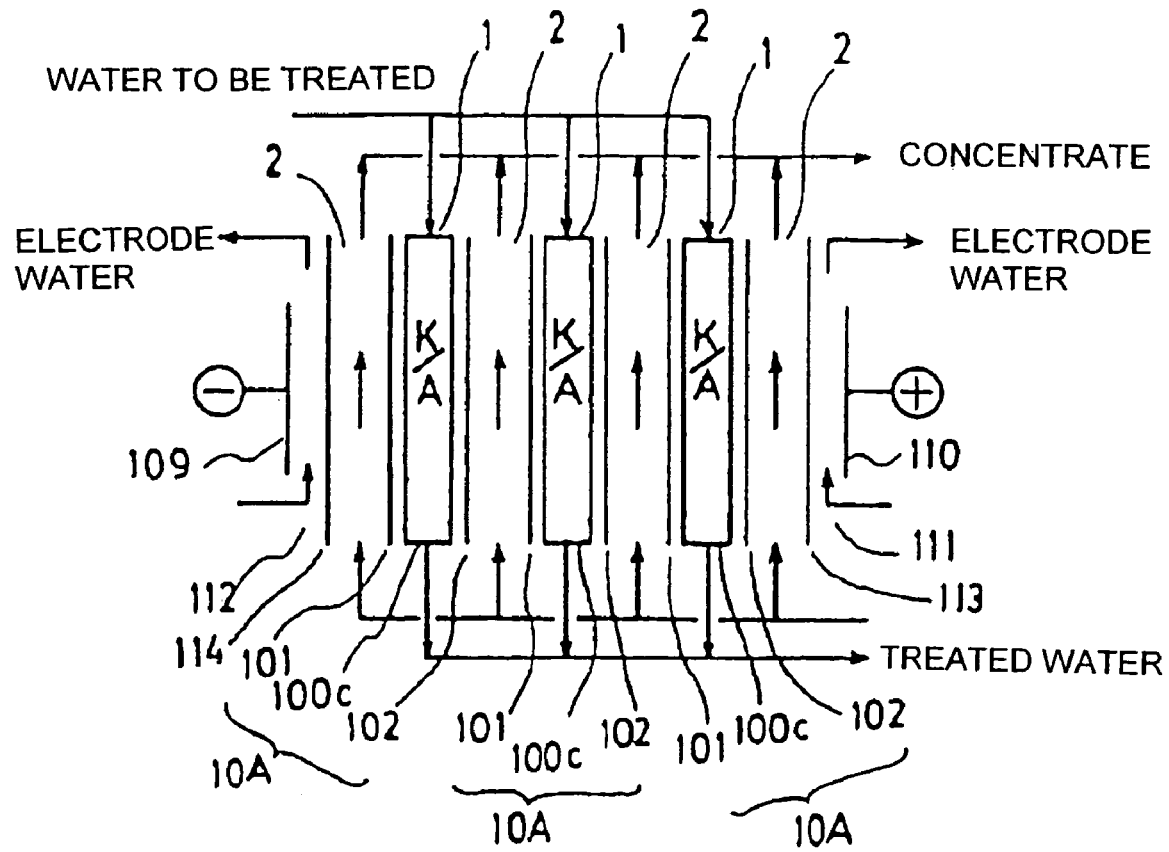
FIG. 3 is a schematic diagram showing an electrodeionization water purification device of the present invention.

The electrodeionization water purification device in an embodiment of the present invention will be described hereinafter with reference to FIG. 3. In FIG. 3, 1 denotes a depletion chamber, 2 denotes a concentrate chamber, and the above-described modules are prepared to constitute these depletion chambers 1. In the present embodiment, a porous amphoteric ion exchanger 100c into which the amphoteric ion exchange group is introduced is charged so as to be held between the anionic exchange membrane 102 and cationic exchange membrane 101 so that the deionization module 10A is formed. A plurality of electrodeionization modules 10A are arranged apart from and in parallel with one another. A spacer (not shown) including a watertight member such as rubber packing formed in a frame shape is disposed between the electrodeionization modules 10A, and a space portion formed in this manner is constituted as the concentrate chamber 2. An anode 110 and cathode 109 are disposed on opposite sides of a structure in which the depletion chambers 1 and concentrate chambers 2 are alternately arranged, partition membranes 113, 114 are disposed in the vicinity of the anode 110 and cathode 109, a space between the partition film 113 and anode 110 is constituted as an anode chamber 111, and a space between the partition film 114 and cathode 109 is constituted as a cathode chamber 112. In FIG. 3, for the sake of diagrammatic representation, the porous amphoteric ion exchanger 100c is disposed apart from the anionic exchange membrane 102 and cationic exchange membrane 101 positioned on the opposite sides, but actually the porous amphoteric ion exchanger 100c is closely attached to the anionic exchange membrane 102 and cationic exchange membrane 101. It is to be noted that also in FIGS. 4 to 7 described later, the porous ion exchanger is closely attached to the ion exchange membrane to form the depletion chamber.

The electrodeionization water purification device of FIG. 3 is operated as follows. First, water to be treated is passed through the depletion chamber 1, concentrate is passed through the concentrate chamber 2, and electrode water is passed through the anode chamber 111 and cathode chamber 112. As the concentrate, usually the same water as the water to be treated which is supplied to the depletion chamber is used. On the other hand, voltage is applied between the anode 110 and cathode 109, and a direct current is passed in a right-angle direction with respect to the flow direction of the water to be treated and concentrate. When the water to be treated flowing into the depletion chamber 1 is circulated in the open cell structure including macropores and mesopores of the porous ion exchanger, ions are captured by the ion exchange group introduced in the open cell structure, and discharged into the concentrate chamber 2 through the ion exchange membranes 101, 102.

Figure 4:
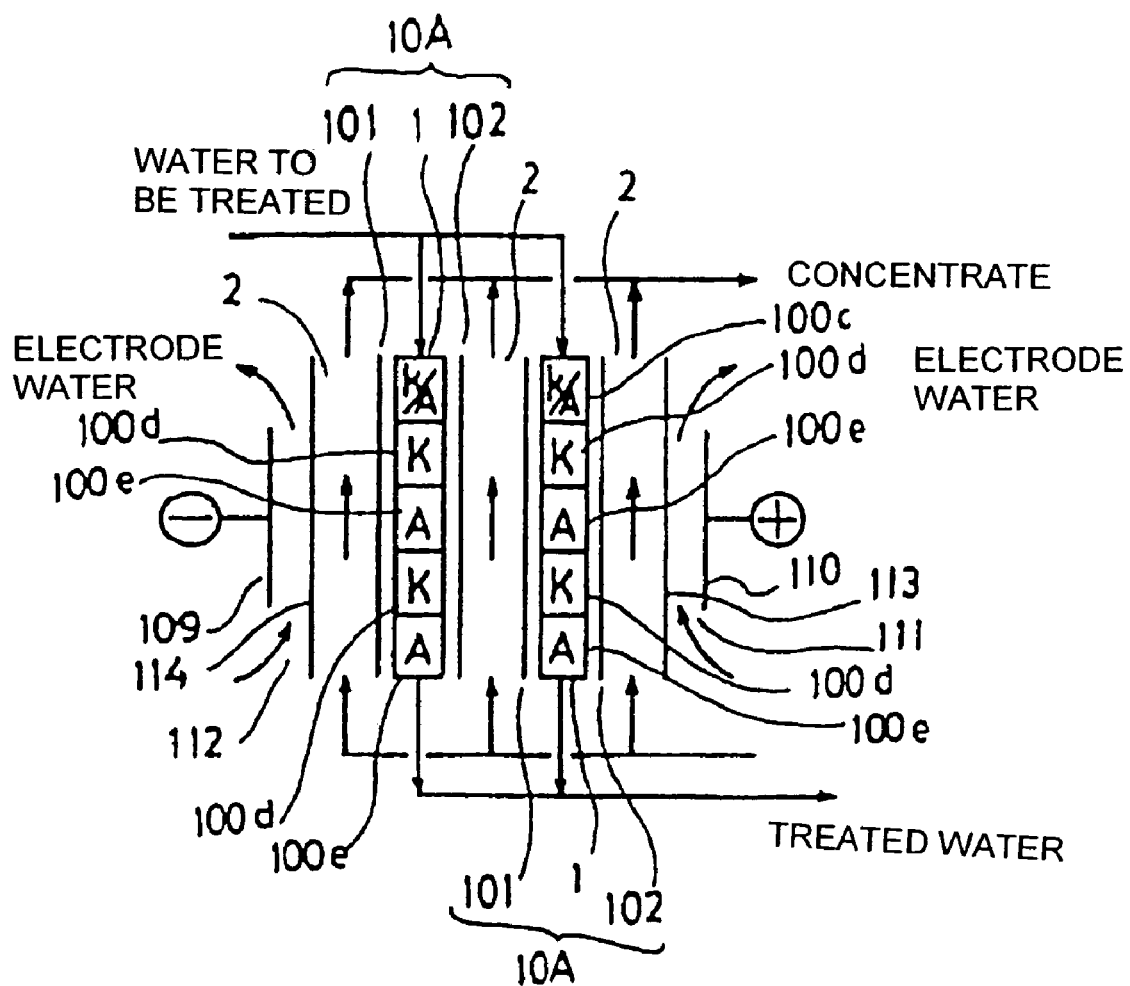
FIG. 4 is a schematic diagram showing another electrodeionization water purification device of the present invention.

The electrodeionization water purification device according to another embodiment is shown in FIGS. 4 to 7. The number of electrodeionization modules is appropriately determined by use conditions such as treatment capability, and FIGS. 4 to 7 show two electrodeionization modules for the purpose of simplifying the drawings. Moreover, the same constituting elements are denoted with the same reference numerals, the description thereof is omitted, and different respects will mainly be described. FIG. 4 is different from FIG. 3 in that the type of the porous ion exchanger constituting the electrodeionization module is changed. For the electrodeionization module 10A for use in the device of FIG. 4, the porous amphoteric ion exchanger 100c into which the amphoteric ion exchange group is introduced, porous cationic exchanger 100d into which the cationic exchange group is introduced, and porous anionic exchanger 100e into which the anionic exchange group is introduced are manufactured in small block shapes. The porous amphoteric ion exchanger 100c, porous cation exchanger 100d, porous anion exchanger 100e, porous cation exchanger 100d, and porous anion exchanger 100e are laminated in order from an inflow side of the water to be treated, and this lamination is held between the anion exchange membrane 102 and cation exchange film 101 in the constitution.

Figure 5:
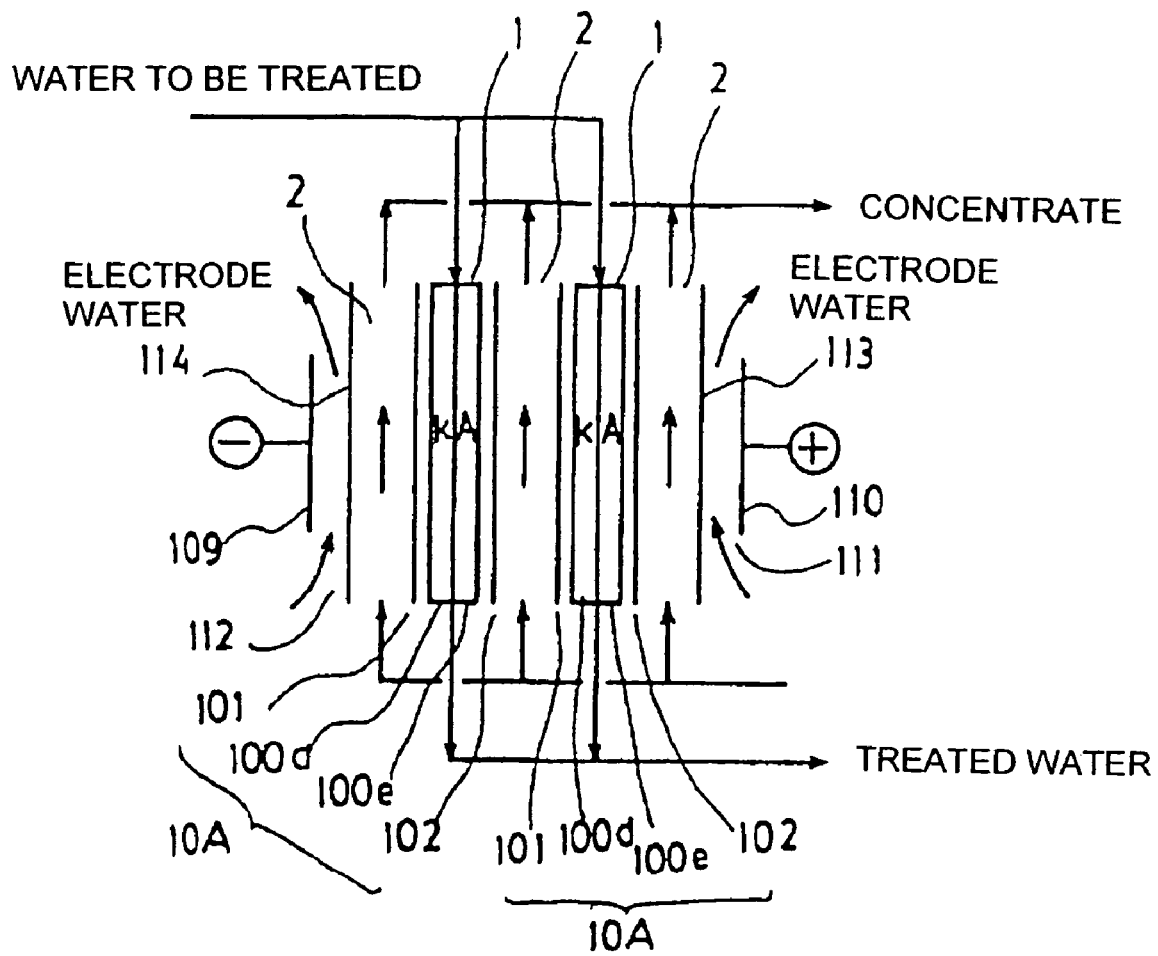
FIG. 5 is a schematic diagram showing another electrodeionization water purification device of the present invention.

FIG. 5 is different from FIG. 3 in that the type of the porous ion exchanger constituting the electrodeionization module is changed. In the electrodeionization module 10A for use in the device of FIG. 5, the porous cation exchanger 100d and porous anion exchanger 100e abut on each other on a porous ion exchanger side, and are held between the anion exchange membrane 102 and cation exchange membrane 101 on the opposite sides disposed opposite to the abutment surface.

Figure 6:
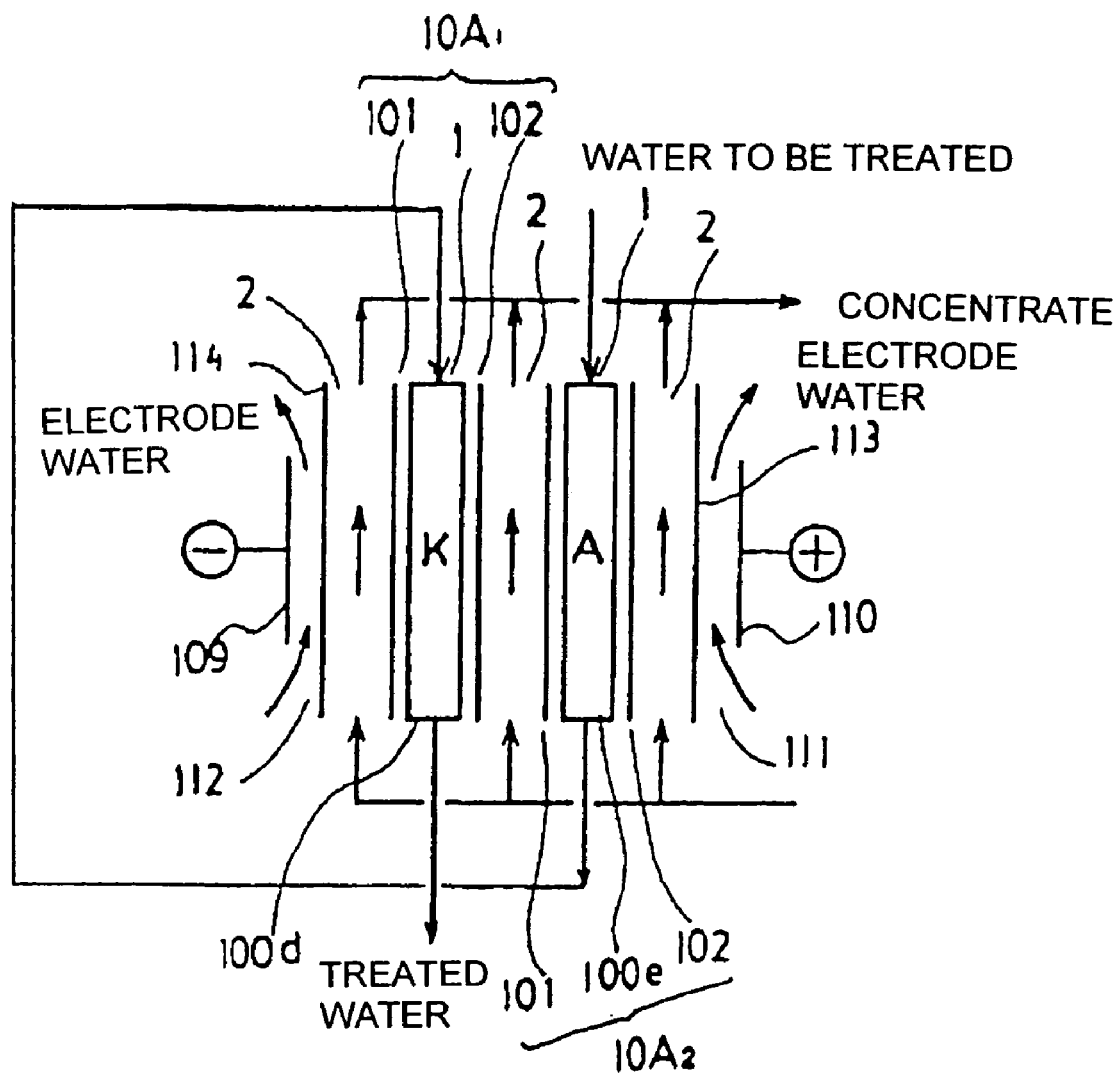
FIG. 6 is a schematic diagram showing another electrodeionization water purification device of the present invention.

FIG. 6 is different from FIG. 3 in that the type of the porous ion exchanger constituting the electrodeionization module is changed, two electrodeionization modules are connected in series, and water flowing out of one deionization module is used as the water to be treated of the other electrodeionization module. That is, in the electrodeionization module 10A for use in the device of FIG. 6, each of the porous cation exchanger 100d into which the cationic exchange group is introduced and the porous anion exchanger 100e into which the anionic exchange group is introduced is charged to be held between the anionic exchange membrane 102 and cation exchange membrane 101, a cation removal module $10A_1$ and a anion removal module $10A_2$ are constituted, and water flowing out of the anion removal module $10A_2$ is used as the water to be treated of the cation removal module $10A_1$.

The electrodeionization module 10A shown in FIG. 1 can be used in any one of electrodeionization modules for use in the devices of FIGS. 3 to 6.

Figure 7:
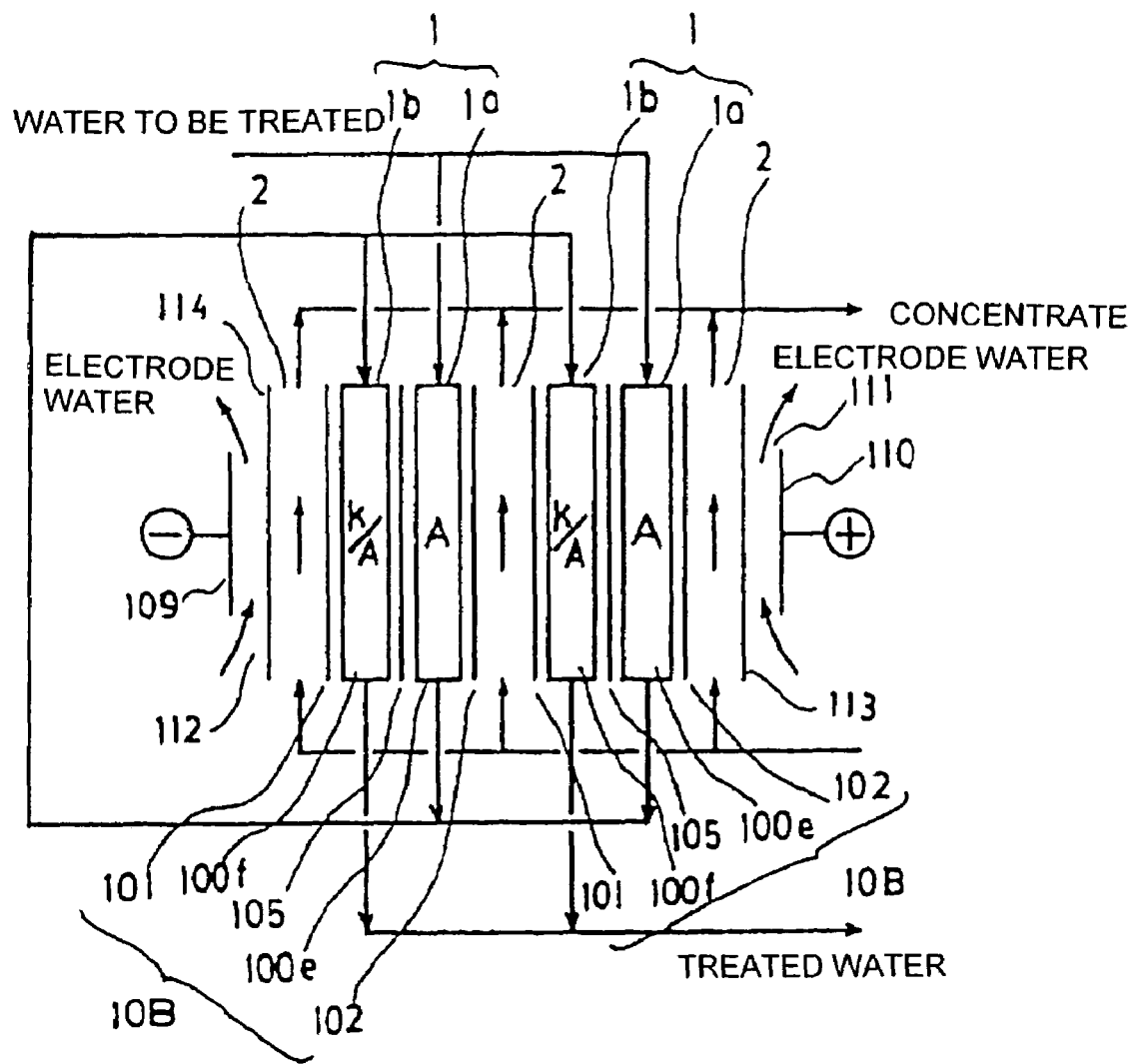
FIG. 7 is a schematic diagram showing another electrodeionization water purification device of the present invention.

On the other hand, the electrodeionization module 10B shown in FIG. 2 can be used in the deionization module for use in the device of FIG. 7. That is, in the device of FIG. 7, for two small desalination chambers 1a, 1b defined by the cationic exchange film 101 on one side, anionic exchange film 102 on the other side, and intermediate ion exchange film 105 positioned between the cationic exchange film 101 and anionic exchange film 102, the porous amphoteric ion exchanger, or a lamination 100f of porous anionic and cation exchangers is charged into the small desalination chamber 1b on the cationic exchange film 101 side, the porous anion exchanger 100e is charged into the small desalination chamber 1a on the anion exchange film 102 side to constitute the depletion chamber 1, the concentrate chambers 2 are disposed on the opposite sides of the depletion chamber via the cationic exchange membrane 101 and anionic exchange membrane 102, and these depletion chamber 1 and concentrate chamber 2 are disposed between the anode 110 and cathode 109 to constitute the device. In the present embodiment, the anion exchange membrane is used as the intermediate ion exchange membrane 105.

The electrodeionization water purification device of FIG. 7 is operated as follows. First, the water to be treated is passed through the small desalination chamber 1a, subsequently the water flowing out of the small desalination chamber 1a is passed through the other adjacent small desalination chamber 1b, the concentrate is passed through the concentrate chamber 2, and the electrode water is passed through the anode chamber 111 and cathode chamber 112. On the other hand, the voltage is applied between the anode 110 and cathode 109, and the direct current is passed in the right-angle direction with respect to the flow direction of the water to be treated and concentrate. When the water to be treated flowing into the small desalination chamber 1a is circulated in the open cell structure including the macropores and mesopores of the porous anionic exchanger 100e, the ions are captured by the ion exchange group introduced in the open cell structure, and removed. Furthermore, when the water flowing out of the small desalination chamber 1a is circulated in the open cell structure including the macropores and mesopores of the lamination 100f of the porous amphoteric ion exchanger or the porous anionic exchanger and porous cationic exchanger, the ions are captured by the ion exchange group introduced in the open cell structure, and removed. The concentrate rises through each concentrate chamber, receives the impurity ions transferred via the cationic exchange membrane 101 and anionic exchange membrane 102, and discharges the impurity ions as the condensed concentrate outside the system.

EXAMPLES

Next, examples of the present invention will further concretely be described. This is only an illustration, and does not limit the present invention.

Example 1-1

(Manufacturing of Porous Cation Exchanger)

Figure 8:
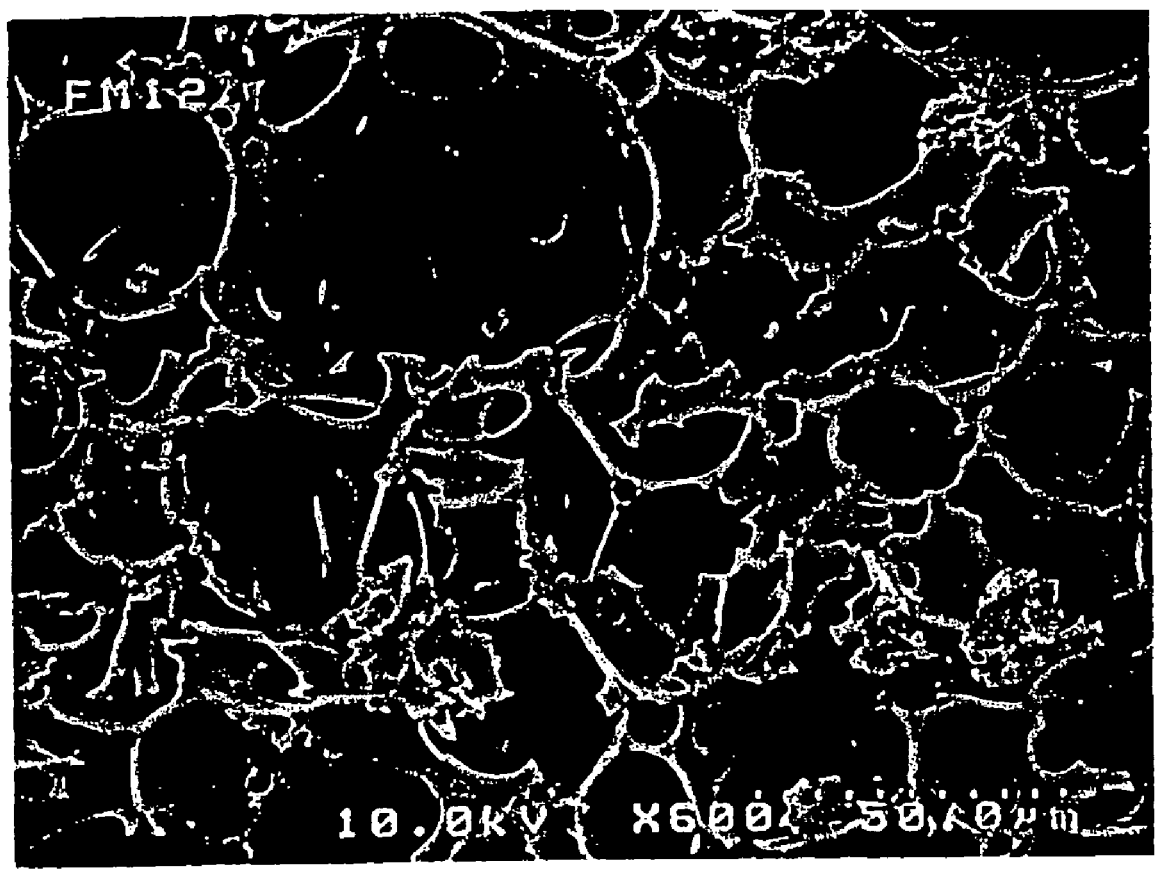
FIG. 8 is an SEM photograph of a porous ion exchanger obtained in an embodiment.

After 27.7 g of styrene, 6.9 g of divinylbenzene, 0.14 g of asobisisobutylonitrile and 3.8 g of sorbitan monooleate were mixed and uniformly dissolved, the resultant styrene/divinylbenzene/asobisisobutylonitrile/sorbitan monooleate mixture was added to 450 mL of deionized water. A homogenizer was used to agitate the mixture at 20000 rotations/minute for two minutes, so that a water-in-oil type emulsion was obtained. After the emulsification ended, the water-in-oil type emulsion was transferred to a stainless-steel autoclave, sufficiently replaced with nitrogen, sealed, and polymerized under a still standing state at 60° C. for 24 hours. After the polymerization ended, the content was taken out, Soxhlet extraction was performed using isopropanol for 18 hours to remove the unreacted monomer and sorbitan monooleate, and pressure reduction and drying were performed at 40° C. overnight. After 5 g of the porous material containing 14 mol % of the crosslinking component including the styrene/divinylbenzene copolymer obtained in this manner was picked up, and 500 g of tetrachloroethane was added thereto. The mixture was heated at 60° C. for 30 minutes, and then cooled to room temperature. Afterward, 25 g of chlorosulfuric acid was gradually added to the mixture, and reaction was carried out at room temperature for 24 hours. Thereafter, acetic acid was added, and the reactants were put into a large amount of water, rinsed, and dried to obtain a porous cationic exchanger. It was confirmed that the ion exchange capacity of the porous material was 4.0 mg equivalent/g in terms of the dry porous material and that the sulfonic acid groups were uniformly introduced into the porous material using EPMA to map sulfur atoms. Moreover, as a result of SEM observation shown in FIG. 8, the internal structure of the porous material includes the open cell structure, most of macropores having an average diameter of 30 μm overlap with one another, the average value of diameters of mesopores formed by the overlap of the macropores was 5 μm, and a total pore volume was 10.1 mL/g. Moreover, when the porous material was cut out in a thickness of 10 mm, and water permeation rate was measured, 14,000 L/minute·m²·MPa was obtained, and excellent water permeation property was indicated.

Example 1-2

(Manufacturing of Porous Anion Exchanger)

Polymerization of a water-in-oil type emulsion was performed in the same manner as in Example 1-1 except that instead of 27.7 g of styrene, 18.0 g of p-chloromethyl styrene was used, and 17.3 g of divinylbenzene and 0.26 g of asobisisobutylonitrile were used, to produce a porous material containing 50 mol % of a crosslinking component including the p-chloromethyl styrene/divinylbenzene copolymer. After 5 g of the porous material was picked up, 500 g of dioxane was added thereto. The resultant mixture was heated at 80° C. for 30 minutes, and then cooled to room temperature. Afterward, 65 g of aqueous trimethylamine (30%) was gradually added to the mixture, and reaction was carried out at 50° C. for three hours. The mixture was allowed to stand at room temperature overnight. After the reaction ended, the porous material was taken out, cleaned with acetone, rinsed, and dried to obtain the porous anion exchanger. It has been confirmed that the ion exchange capacity of the porous material was 2.5 mg equivalent/g in terms of the dry porous material and that the trimethylammonium groups are uniformly introduced into the porous material by SIMS. Moreover, as a result of SEM observation, the internal structure of the porous material includes the open cell structure, most of macropores having an average diameter of 30 μm overlapped with one another, the average value of diameters of mesopores formed by the overlap of the macropores was 4 μm, and the total pore volume was 9.9 mL/g. Moreover, when the porous material was cut out in a thickness of 10 mm, and water permeation rate was measured, 12,000 L/minute·m²·MPa was obtained, and the excellent water permeation property was indicated.

Comparative Example 1-1

The same procedure as in Example 1-1 was carried out except that 0.60 g of potassium persulfate was used instead of 0.14 g of asobisisobutylonitrile and an amount of sorbitan monooleate was changed to 15.5 g from 3.8 g, to obtain the porous cation exchanger. For the obtained porous material, the ion exchange capacity was 4.0 mg equivalent/g in terms of the dry porous material, and the total pore volume was 9.2 mL/g. However, the average value of diameters of mesopores was as small as 0.2 μm. When the water permeation rate was measured in the same manner as in Example 1-1, the permeation rate was 40 L/minute·m²·MPa.

Example 1-3

(Preparation of Electrodeionization Module)

The porous cation exchanger, porous anion exchanger, or porous amphoteric ion exchanger obtained in Examples 1-1 and 1-2 was cut to a size of 100 mm in length, 100 mm in breadth and 8 mm in width to obtain five small blocks. That is, the porous amphoteric ion exchanger 100c, porous cationic exchanger 100d, and porous anionic exchanger 100e were prepared in small block shapes. In order from the inflow side of the water to be treated, the porous amphoteric ion exchanger 100c, porous cationic exchanger 100d, porous anionic exchanger 100e, porous cationic exchanger 100d, and porous anionic exchanger 100e were laminated, and filled so as to be held between the anionic exchange membrane 102 and cationic exchange membrane 101, so that an electrodeionization module was obtained for use in the device of FIG. 4.

Example 1-4

(Manufacturing and Running of Electrodeionization Water Purification Device)

The obtained deionization module was used to manufacture the electrodeionization water purification device. The electrodeionization water purification device was constituted of one depletion chamber, one anode chamber, and one cathode chamber. Spacers were inserted between the depletion chamber and anode chamber and between the depletion chamber and cathode chamber to form the concentrate chamber. Water which was obtained by treating city water with a reverse osmosis membrane and which had a conductivity of 3.6 μS/cm was supplied as the water to be treated to the electrodeionization water purification device, and the device was operated. At an operation current of 0.40 A of the electrodeionization water purification device, treated water having a specific resistance of 5.0 M Ω·cm was obtained. An operation voltage at this time was 20 V.

Comparative Example 1-2

An electrodeionization water manufacturing device was operated under the same conditions as in Example 1-4 except that a mixture of Amberite 120B and Amberite 402BL having equivalent and equal ion exchange capacity was used instead of the porous ion exchanger of the open cell structure. Water which was obtained by treating city water with a reverse osmosis membrane and which had a conductivity of 3.6 μS/cm was supplied as the water to be treated to the electrodeionization water purification device, and the device was operated. At the operation current of 0.40 A of the electrodeionization water purification device, treated water having a specific resistance of 5.0 M Ω·cm was obtained. The operation voltage at this time was 30 V.

In comparison of Example 1-4 with Comparative Example 2, it was confirmed that with the use of the porous ion exchangers as the ion exchanger, it was thereby possible to reduce the operation voltage of the electrodeionization water purification device and to reduce power consumption. Moreover, to prepare the electrodeionization module, in Comparative Example 1 the ion exchange resins had to be uniformly filled in a wetted state, and the manufacturing requires much trouble. On the other hand, there was not the step of uniform filling of the ion exchange resins in Examples 1-3 and 1-4, and the manufacturing was facilitated.

As described above, the porous ion exchangers of the present invention are ion exchangers including the specific open cell structure, and include a novel structure totally different from that of the conventional particle aggregation type porous material. Especially, while the porous material holds strength, the pore volume and specific surface area can remarkably be enlarged. According to the electrodeionization module of the present invention, the porous ion exchangers filled into the space between the ion exchange membranes can be formed, for example, in the flat plate or cylindrical shape, and the polymer material which can easily be cut can be used. Therefore, the structure can easily be assembled, and simplified. Moreover, for the electrodeionization water purification device of the present invention, since the deionization efficiency is high, the voltage at the operation time is lowered, and the device can be of a power saving type in which the power consumption can be reduced.

Moreover, in the porous ion exchangers according to the present invention, the cation ion exchange resin is preferably used in the solid acid catalyst. This will be described.

That is, the porous ion exchanger of the present invention includes the open cell structure including the mesopores having an average diameter in a range of 1 to 1000 μm, preferably 10 to 100 μm.

As described above, since the structure of the porous ion exchanger is the above-described open cell structure, the macropore and mesopore groups can uniformly be formed, and the pore volume and specific surface area can remarkably be enlarged as compared with the particle aggregation type porous material described in Japanese Patent Publication No. 1987-42658. Therefore, when the exchanger of the present invention is used as the solid acid catalyst, its catalyst activity is remarkably enhanced, and the catalyst is very advantageous.

The porous ion exchanger for use in the solid acid catalyst is basically the above-described porous ion exchanger. With the solid acid catalyst, the cation exchange group is introduced as the ion exchange group.

Then, examples of the ion exchange group to be introduced include cationic exchange groups such as the carboxyl group, iminodiacetic acid group, sulfonic acid group, and phosphoric acid group.

The solid acid catalyst of the present invention can be used, for example, in organic reactions such as esterification and hydrolysis of ester. It is especially preferable to use the catalyst in a reaction distillation method of reacting supplied reaction raw materials in a reaction distillation tower and continuously taking a reaction product out of a reaction system using a difference of boiling point, in that sufficiently high catalyst activity is maintained and permeation property for gas or liquid including the raw material, product, or mixture of these can rapidly be enhanced.

A filling mode of the solid acid catalyst of the present invention into the reaction tower is not especially limited, and examples of the mode include: a method of filling a catalyst manufactured as such in accordance with the shape inside the reaction tower; a method of dividing the catalyst into a plurality of block shapes and laminating and filling the blocks; a method of partially incorporating and using a layer using a conventional granular cation exchange resin. Furthermore, the solid acid catalyst of the present invention can be processed/molded and filled together with a support member. In this case, support strength of the solid acid catalyst in the reaction tower increases. The catalyst can thus be used, even when a liquid passing speed in the reaction tower is high.

Example 2-1

(Manufacturing of Porous Cation Exchanger)

The above-described porous cationic exchanger of Example 1-1 was used. The porous material was cut to a thickness of 10 mm. When the water permeation rate and air permeation were measured, the rates were 14,000 L/minute·m$^2$·MPa and 3,600 m$^3$/minute·m$^2$·MPa, respectively, and the excellent permeation properties were indicated.

Comparative Example 2-1

The above-described porous cationic exchanger of Comparative Example 1-1 was used. When the water and air permeation rates were measured in the same manner as in Example 2-1, the rates were 40 L/minute·m$^2$·MPa and 30 m$^3$/minute·m$^2$·MPa, respectively, and the permeation properties were inferior.

Example 2-2

(Hydrolysis Reaction of Methyl Acetate by Reaction Distillation)

A jacketed column having an inner diameter of 25 mm was used as a reaction distillation tower, a glass helix having a diameter of 4 mm was filled into a lower portion thereof up to a height of 800 mm to form a recovery portion, and the porous cationic exchanger obtained in Example 2-1 was cut to a diameter of 25 mm and a height of 800 mm and filled as a solid acid catalyst into an upper portion thereof to form a reaction portion. An amount of the filled catalyst was 27.5 g in terms of dry weight. A methyl acetate/methanol mixture liquid (mol ratio of 1.0/0.4) was supplied to the reaction distillation tower from a lower end of the reaction portion at a flow rate of 100 g/hour. On the other hand, water was supplied from an upper end of the reaction portion at a flow rate of 100 g/hour, and the reaction was performed. It is to be noted that any supply liquid was heated to 65° C. and supplied, and warm water at 65° C. was circulated through a jacket of the reaction distillation tower. The liquid in the still was heated to 85° C., and then treated under total reflux. After the reaction was stabilized, hydrolysis ratios (reaction ratios) were measured, and a reaction ratio of 97% was obtained on the average.

Comparative Example 2-2

Amberlist 15 WET having a water wet state and corresponding to a dry weight of 27.5 g was filled into a jacketed column having an inner diameter of 25 mm. A liquid obtained by mixing the same weights of a methyl acetate/methanol mixture liquid (mol ratio of 1.0/0.4) and water was passed through the column. It is to be noted that the supply liquid was heated to 50° C. and supplied, and warm water at 50° C. was circulated through the jacket of the column. The reaction ratio rose with the drop of a liquid passing rate. When the liquid passing rate was 150 mL/hour, the ratio was 55%. However, even when the liquid passing rate was reduced to below 150 mL/hour, enhancement of the reaction ratio was not recognized.

The solid acid catalyst including the porous ion exchanger of the present invention has high cation exchange group density and large pore volume and specific surface area, therefore indicates high catalyst activity, and is also superior in the permeation property for gas or liquid including the raw material, product, or mixture of these. Therefore, the catalyst allows the organic reaction to efficiently proceed in a short time and with a high reaction ratio, and can be applied as the solid acid catalyst for reaction distillation not only to an ordinary organic reaction process but also to broad areas of application.

Another invention useful as an adsorbent, filler for chromatography, and ion exchanger will next be described by a technique similar to that of the above-described porous ion exchanger.

A basic structure of an organic porous material and organic porous ion exchanger of the present invention is an open cell structure which includes interconnected macropores and mesopores having an average diameter of 1 to 1000 μm, preferably 5 to 10 μm, existing on the walls of the macropores. In the inner wall of the cell formed by the macropores and mesopores, there are further non-continuous micropores having an average pore diameter of 5 to 800 nm, preferably 5 to 500 nm. That is, in the open cell structure, usually the macropores having an average diameter of 2 to 5000 μm overlap with one another, the overlapped portions include mesopores as common orifices, and the portion includes an open pore structure. When liquid or gas is passed through the open pore structure, the channel is formed in the cell structure formed by the macropores and mesopores. For the overlap of the macropores, there are one to 12 overlaps per macropore, three to ten overlaps at most. When the average diameter of the mesopores is less than 1 μm, pressure loss during a liquid or gas permeation time unfavorably increases. On the other hand, when the average diameter of mesopores is larger than 1000 μm, the liquid or gas insufficiently contacts the porous ion exchanger. As a result, adsorption or ion exchange characteristics are unfavorably deteriorated. Since the organic porous material and organic porous ion exchanger include the above-described open cell structure, the macropore and mesopore groups can uniformly be formed. Additionally, as compared with the particle aggregation type porous ion exchanger described in F. Svec, Science, 273, 205 to 211 (1996), and the like, the pore volume can remarkably be increased.

Furthermore, when the above-described micropores having an average pore diameter of 5 to 800 nm are introduced into the inner wall of the cell structure, the specific surface area can remarkably be enlarged. The micropore is formed by micro concave/convex portions having undefined shapes, and the average pore diameter is determined by a known nitrogen adsorption method or mercury press-fit method. When the average diameter of the micropore is less than 5 nm, the specific surface area is not much enlarged. Even when the exchanger is used as the filler for chromatography, superior capability is not easily obtained and this exchanger is unfavorable. On the other hand, when the average diameter of the micropore exceeds 800 nm, the strength of the organic porous material or organic porous ion exchanger unfavorably drops. The specific surface areas of the organic porous material and organic porous ion exchanger of the present invention largely change by the setting of the total pore volume of the porous material, but can arbitrarily be set in a range of 10 to 500 $m^2/g$. For the specific surface area of the organic porous material or organic porous ion exchanger of the present invention, a high specific surface area can be used which exceeds that of the conventional porous synthetic adsorbent or ion exchange resin having the area of 10 $m^2/g$ at most and which has not been heretofore achieved. Especially, when the organic porous material of the present invention is used as the adsorbent, the material having a specific surface area in a range of 50 to 500 $m^2/g$ is preferable. Because the anionic exchange is remarkably enhanced. The specific surface area can be obtained by the BET method.

Moreover, the organic porous material and organic porous ion exchanger have a total pore volume of 1 to 50 mL/g. When the total pore volume is less than 1 mL/g, the permeation of liquid or gas amount per unit sectional area is reduced, and treatment capability unfavorably drops. On the other hand, when the total pore volume exceeds 50 mL/g, the strengths of the organic porous material and organic porous ion exchanger unfavorably remarkably drop. For the total pore volume, the conventional porous synthetic adsorbent or ion exchange resin is in a range of 0.1 to 0.9 mL/g at most, but the high pore volume of 1 to 50 mL/g, preferably 5 to 50 mL/g of the organic porous material and organic porous ion exchanger in accordance with the preset invention can be used which exceeds this range and which has not heretofore been achieved.

Moreover, for the permeation properties for the liquid and gas of the organic porous material and organic porous ion exchanger, water is used as the representative liquid, and air is used as the representative gas. When the thickness of the organic porous material or organic porous ion exchanger is assumed as 10 mm, the respective permeation rates are preferably in ranges of 100 to 100000 L/minute·$m^2$·MPa and 100 to 50000 $m^3$/minute·$m^2$·MPa. When the permeation rate, total pore volume, and specific surface area are in the above-described ranges, and when this material is used as the adsorbent, ion exchanger, or filler for chromatography, a contact area with the liquid or gas is large, smooth circulation of the liquid or gas is possible, and the material has further sufficient mechanical strength and can fulfill superior capability. The material of the framework portion forming the open cell is an organic polymer material which has a crosslinking structure. The polymer material preferably contains a crosslinking structure unit of 10 to 90 mol % with respect to all the constituting units which constitute the polymer material. When the crosslinking structure unit is less than 10 mol %, the mechanical strength unfavorably falls short. On the other hand, when the unit exceeds 90 mol %, the introduction of the ion exchange group becomes difficult, and the ion exchange capacity unfavorably drops.

The type of the polymer material is not especially limited, and examples of the material include: styrene-based polymers such as polystyrene, poly(α-methylstyrene), and polyvinylbenzylchloride; polyolefins such as polyethylene and polypropylene; poly(olefin halide) such as polyvinylchloride, and polytetrafluoroethylene; nitrile-based polymers such as polyacrylonitrile; (meth)acryl-based polymers such as polymethyl methacrylate and polyacrylic ethyl; styrene-divinylbenzene copolymer; vinylbenzyl chloride-divinylbenzene copolymer; and the like. The above-described polymer may either homo polymer obtained by polymerizing single monomer, or copolymer obtained by polymerizing a plurality of monomers. Moreover, two or more polymers may also be blended. Among these organic polymer materials, in view of the ease of introduction of the ion exchange group and high mechanical strength, the styrene-divinylbenzene copolymer or vinylbenzylchloride-divinylbenzene copolymer is the example of the preferable material. The open cell structure of the organic porous material or organic porous ion exchanger of the present invention can be observed with SEM. Moreover, the pore diameters of the macropores and mesopores are also determined by the SEM observation.

To use the organic porous material of the present invention as the adsorbent, for example, the cutout shape of the organic porous material which can be inserted into a cylindrical or square column is inserted as the adsorbent into the column. When the water to be treated containing hydrophobic materials such as benzene, toluene, phenol, and paraffin is passed through the column, the above-described hydrophobic materials are efficiently adsorbed by the adsorbent. The specific surface area and pore volume of the conventional porous synthetic adsorbent are 10 m$^2$/g and 0.9 mL/g at most, and the adsorbent of the present invention can attain the adsorption capability several or more times that of the conventional adsorbent.

To use the organic porous material of the present invention as the filler for chromatography, for example, the cutout shape of the organic porous material which can be inserted into the cylindrical or square column is filled as the filler into the column, and the water to be treated containing polymer compounds such as protein and enzyme are passed through the column. Then, while the strength is held, the large contact area can be obtained, and the high-molecular-weight components of protein and enzyme are sufficiently fractionated. In the conventional inorganic porous material of the open cell structure, the rize of the micropores is 100 nm at maximum. Therefore, the filler for chromatography of the present invention can attain the superior fractionation capability of the polymer components as compared with the conventional filler. Examples of the chromatography include ion chromatography, reverse phase liquid chromatography, and forward phase liquid chromatography.

For the organic porous ion exchanger of the present invention, the ion exchange groups are uniformly distributed, and the ion exchange capacity is not less than 0.5 mg equivalent/g of dry porous material, preferably not less than 2.0 mg equivalent/g of dry porous material. When the ion exchange capacity is less than 0.5 mg equivalent/g of dry porous material, the ion exchange capability unfavorably drops. Moreover, when the distribution of the ion exchange group is nonuniform, dispersion is generated in ion exchange reaction, capture ratio of ions drops, and it is unfavorably difficult to perform ion exchange treatment at high rate. It is to be noted that "the ion exchange groups are uniformly distributed in the porous material" described herein means the uniform distribution of the ion exchange groups of at least a μm order. The distributed circumstance of ion exchange groups can easily be confirmed using EPMA, SIMS, and the like. Examples of the ion exchange group to be introduced into the organic porous material include: cationic exchange groups such as a sulfonic acid group, carboxylic acid group, iminodiacetic acid group, phosphoric acid group, and phosphoric ester group; anionic exchange groups such as a quaternary ammonium group, tertiary amino group, secondary amino group, primary amino group, polyethylene imine, tertiary sulfonium group, and phosphonium group; and amphoteric ion-exchange groups such as betaine and sulfobetaine.

The organic porous material and organic porous ion exchanger of the present invention include the open cell structure including the interconnected macropores and mesopores having an average diameter of 1 to 1000 μm existing on walls of the macropores, and further micropores as non-continuous pores having an average pore diameter of 5 to 800 nm. This structure is a novel structure far different from that of the conventional particle aggregation type porous material. While the strength of the porous material is held, the pore volume and specific surface area can remarkably be enlarged.

One example of the manufacturing method of the organic porous material will be described hereinafter. That is, for the organic porous material, the oil-soluble monomer not containing the ion exchange group, precipitant which is a poor solvent against the polymer obtained by polymerizing the oil-soluble monomer and by which the oil-soluble monomer is dissolved, surface-active agent, water, and polymerization initiator if necessary are mixed, the water-in-oil type emulsion is prepared and polymerized, and the material is manufactured.

The oil-soluble monomer not containing the ion exchange group is an oleophic monomer which does not contain ion exchange groups such as the carboxylic acid group, sulfonic acid group, and quaternary ammonium group and which has low solubility with respect to water. Concrete examples of these monomers include styrene, α-methylstyrene, vinyltoluene, vinylbenzylchloride, divinylbenzene, ethylene, propylene, isobutene, butadiene, isoprene, chloroprene, chloroethene, vinyl bromide, vinylidene chloride, tetrafluoroethylene, acrylonitrile, methacrylonitrile, vinyl acetate, methyl acrylate, ethyl acrylate, butyl acrylate, 2-ethylhexyl acrylate, trimethylolpropane triacrylate, butanediol diacrylate, methyl methacrylate, ethyl methacrylate, propyl methacrylate, butyl methacrylate, 2-ethylhexyl methacrylate, cyclohexyl methacrylate, benzyl methacrylate, glycidyl methacrylate, and ethylene glycol dimethacrylate. These monomers can be used alone or as a combination of two or more thereof. Additionally, in the present invention, the crosslinking monomers such as divinyl benzene and ethylene glycol dimethacrylate are selected as at least one component of the oil-soluble monomer, and the content is set to a range of 10 to 90 mol %, preferably 12 to 80 mol % in the total oil-soluble monomer. This is preferable in that the necessary mechanical strength is obtained in introducing a large amount of ion exchange groups in the subsequent step.

As the precipitant which is a poor solvent against the polymer obtained by polymerizing the oil-soluble monomer and which dissolves the oil-soluble monomer, various precipitants can be selected in accordance with the type of the oil-soluble monomer. As the precipitant, apliphatic hydrocarbons such as hexane, heptane, octane, isooctane, and decane; and alcohols such as 1-butanol, 2-butanol, e-methyl-2-butanol, and methyl isobutyl carbinol can be used when a mixture of styrene and divinyl fenzere is used as the oil soluble monomer. The addition amount of the precipitant should vary with the content of divinylbenzene in the oil-soluble monomer, and can be selected in a range of 10 to 70%, preferably 20 to 60% with respect to the total amount of the oil-soluble monomer and precipitant. By the adding of the precipitant, for example, an initial polymer of styrene and divinylbenzene is not easily dissolved in oil contents such as the oil-soluble monomer. As a result, the polymer is precipitated in a micro particulate state, these micro particulate materials form an aggregate, and micro concave/convex portions appear in the surface. When the addition amount of precipitant is large, many micropores are developed, but the strength tends to drop. When the amount is small, the micropores are not easily developed. Moreover, the pore diameter of micropores can be controlled by appropriately selecting a blend amount of precipitant or a blend ratio of the crosslinking monomer and precipitant. As a method of forming the micropores, in addition to the adding of the precipitant, examples of the method include: a method of adding a straight-chain polymer such as the polymer of the oil-soluble monomer; a method of adding swelling agent as good solvent for the polymer obtained by polymerizing the oil-soluble monomer together with the precipitant; and a method of using both the straight-chain polymer and the swelling agent or precipitant.

The surface-active agent is not especially limited as long as the water-in-oil type (W/O) emulsion can be formed in mixing the oil-soluble monomer not containing the ion exchange group and water. There can be used: non-ion surface-active agents such as sorbitan monooleate, sorbitan monolaurate, sorbitan monopalmitate, sorbitan monostearate, sorbitan trioleate, polyoxyethylene nonylphenyl ether, polyoxyethylene stearyl ether, and polyoxyethylene sorbitan monooleate; anionic surface-active agents such as potassium oleate, sodium dodecylbenzenesulfonate, and dioctyl sodium sulfosuccinate; cationic surface-active agents such as distearyl dimethyl ammonium chloride; and amphoteric surface-active agents such as lauryl dimethyl betaine. These surface-active agents can be used alone or as a combination of two or more thereof. It is to be noted that the water-in-oil type emulsion is an emulsion including a continuous phase as an oil phase and droplets are dispersed in the phase. The addition amount of the surface-active agent largely should vary with the type of the oil-soluble monomer and the size of emulsion particles (macropores) to be formed, and cannot therefore categorically be determined. However, the amount can be selected in a range of about 2 to 70% with respect to the total amount of the oil-soluble monomer and surface-active agent.

As the polymerization initiator, a compound which generates the radical by heat and irradiation is preferably used. The polymerization initiator may either be water-soluble or oil-soluble. Examples of the polymerization initiator include asobisisobutyronitrile, asobiscyclohexanenitrile, asobiscyclohexanecarbonitrile, benzoyl peroxide, potassium persulfate, ammonium persulfate, hydrogen peroxide-iron chloride, sodium persulfate-acid sulphite sodium, tetramethyl thiram disulfide, and the like. Additionally, depending on circumstances, the polymerization proceeds with heating or irradiation alone without adding the polymerization initiator in some system, and it is unnecessary to add the polymerization initiator in the system.

The method of mixing the oil-soluble monomer not containing the ion exchange group, precipitant, surface-active agent, water, and polymerization initiator to form the water-in-oil emulsion is not especially limited. There can be used: a method of once mixing the respective components in a batch; a method of separately uniformly dissolving oil-soluble components such as the oil-soluble monomer, precipitant, surface-active agent, and oil-soluble polymerization initiator, and water-soluble components such as water and water-soluble polymerization initiator and thereafter mixing the respective components; and the like. The mixing device for forming the emulsion is not especially limited, a usual mixer, homogenizer, high-pressure homogenizer, rotation/revolution system super mixer, vacuum agitation defoaming mixer, and the like can be used, and the appropriate device for obtaining the target emulsion particle diameter may be selected. Moreover, the mixing conditions are not especially limited, and the agitation rotation number or agitation time can arbitrarily be set so that the target emulsion particle diameter can be obtained. It is to be noted that the mixture ratio of the oil-soluble and water-soluble components can arbitrarily be set in a range of (oil-soluble component)/(water-soluble component)=2/98 to 50/50, preferably 5/95 to 30/70 in terms of a weight ratio.

For the polymerization conditions for polymerizing the water-in-oil type emulsion obtained in this manner, various conditions can be selected in accordance with the type of monomer and polymerization initiator system. For example, when asobisisobutylonitrile, benzoyl peroxide, potassium persulfate, and the like are used as the polymerization initiator, the emulsion may be heated/polymerized at 30 to 100° C. for one to 48 hours in the sealed container under the inert atmosphere. When hydrogen peroxide-iron chloride, sodium persulfate-acid sodium sulfite, and the like are used as the initiator, the emulsion may be polymerized at 0 to 30° C. for one to 48 hours in the sealed container under the inert atmosphere. After the polymerization ends, the content is taken out. If necessary, for a purpose of removing the unreacted monomer and surface-active agent, extraction is performed using the solvents such as isopropanol, and the organic porous material is obtained. That is, in the water-in-oil type emulsion, oil content is polymerized to form a framework structure, and a water droplet portion forms a cell portion.

A manufacturing method of the organic porous ion exchanger of the present invention will next be described. The manufacturing method of the organic porous ion exchanger is not especially limited, and examples of the method include: a method of forming the components containing the ion exchange groups into the organic porous ion exchanger in one stage; and a method of manufacturing the organic porous material by the above-described method and subsequently introducing the ion exchange groups. Among these, the method of manufacturing the organic porous material and introducing the ion exchange group is preferable in that the structure control of the obtained organic porous ion exchanger can strictly be controlled.

The method of introducing the ion exchange group into the organic porous material is not especially limited, and known methods such as polymer reaction and graft polymerization can be used. Examples of a method of introducing the sulfonic acid group include: a method of using chlorosulfuric acid, concentrated sulfuric acid, or fuming sulfuric acid to sulfonate the material, when the organic porous material is a styrene-divinyl benzene copolymer; a method of introducing a radical initiation group or chain transfer group into the organic porous material and graft-polymerizing sodium styrenesulfonate or acrylamide-2-methylpropane sulfonic acid; a method of similarly graft-polymerizing glycidyl methacrylate and subsequently introducing the sulfonic acid group by functional group conversion; and the like. Moreover, examples of the method of introducing the quaternary ammonium group include: a method of introducing the chloromethyl group by chloromethyl methyl ether, and thereafter reacting the group with tertiary amine, when the organic porous material is the styrene-divinylbenzene copolymer; a method of manufacturing the organic porous material by copolymerization of chloromethyl styrene and divinyl benzene, and reacting the material with tertiary amine; a method of introducing the radical initiation group or chain transfer group into the organic porous material to graft-polymerize N,N,N-trimethylammonium ethylacrylate or N,N,N-trimethylammonium propyl acrylamide; a method of similarly graft-polymerizing glycidyl methacrylate and subsequently introducing the quarternary ammonium group by the functional group conversion; and the like. Moreover, examples of a method of introducing betaine include: a method of introducing tertiary amine into the porous material as described above, and subsequently reacting and introducing monoiodoacetic acid; and the like. It is to be noted that examples of the ion exchange group to be introduced include: the cationic exchange groups such as the carboxylic acid group, iminodiacetic acid group, sulfonic acid group, phosphoric acid group, and phosphoric ester group; anionic exchange groups such as the quaternary ammonium group, tertiary amino group, secondary amino group, primary amino group, polyethylene imine, tertiary sulfonium group, and phosphonium group; and amphoteric ion-exchange groups such as betaine and sulfobetaine.

The present invention will next concretely be described in terms of examples, but this is simply an illustration, and does not limit the present invention.

Example 3-1

(Manufacturing of Organic Porous Material)

Figure 9:
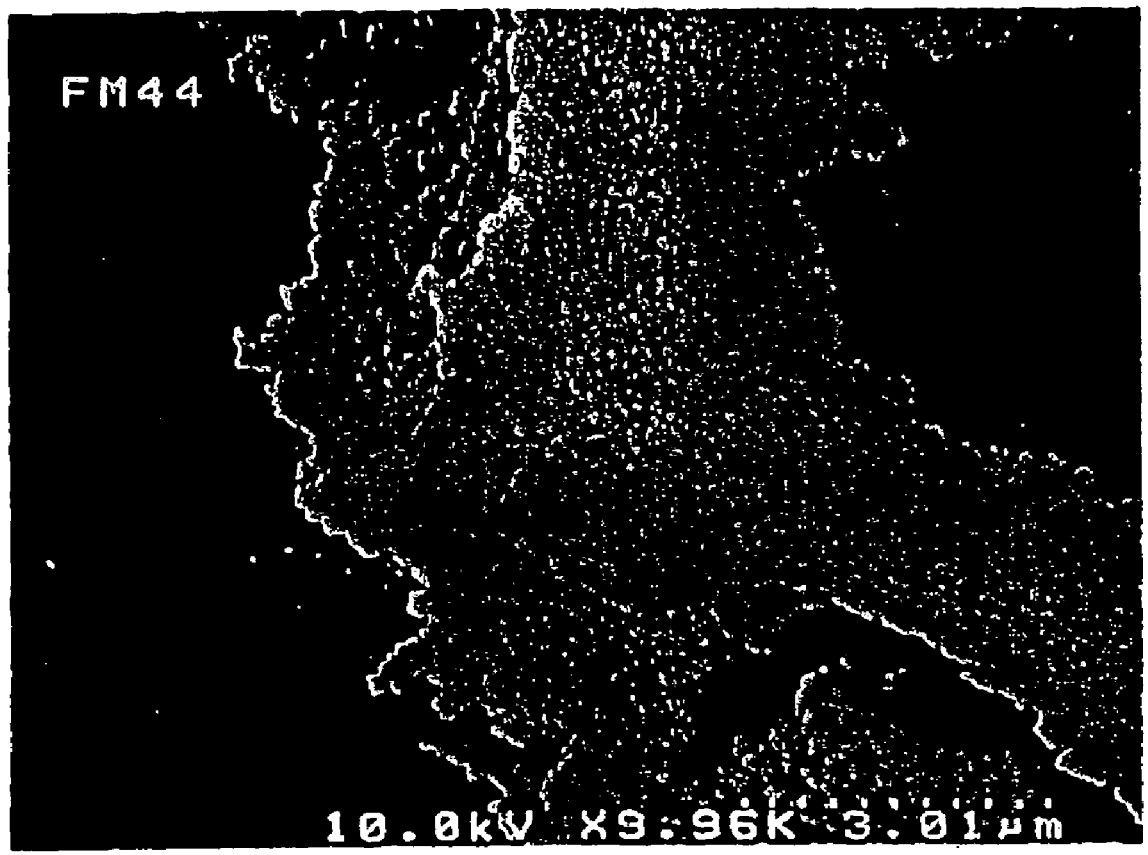
FIG. 9 is an SEM photograph of an organic porous material obtained in another embodiment.

32.91 g of styrene, 17.72 g of divinylbenzene, 21.70 g of n-heptane, 8.04 g of sorbitan monooleate, and 0.29 g of asobisisobutylonitrile (ABIBN) were mixed and uniformly dissolved. Subsequently, the resultant styrene/divinylbenzene/n-heptane/sorbitan monooleate/asobisisobutylonitrile mixture was added to 450 mL of deionized water. A homogenizer was used to agitate the mixture at 20000 rotations/minute for two minutes, so that the water-in-oil type emulsion was obtained. After the emulsification ended, the water-in-oil type emulsion was transferred to an autoclave, sufficiently replaced with nitrogen, sealed, and polymerized under the still standing state at 60° C. for 24 hours. After the polymerization ended, the content was taken out, Soxhlet extraction was performed using isopropanol for 18 hours, the unreacted monomer, n-heptane, water, and sorbitan monooleate were removed, and pressure reduction and drying were performed at 85° C. overnight. The inner structure of the organic porous material containing 26 mol % of crosslinking components including the styrene/divinylbenzene copolymer obtained in this manner was observed by SEM. The result is shown in FIG. 9. In FIG. 9, a middle portion shown in a "V"-shape corresponds to the inner wall of the cell portion of the framework structure, and dark portions on right upper and left sides correspond to mesopores. Moreover, the inner wall of the cell portion of the framework structure is seen inside the mesopores. In this manner, the organic porous material includes the open cell structure, most of macropores having an average diameter of 20 μm overlap with one another, the average diameter of the mesopores formed by the overlap of the macropores is in a range of 0.8 to 20.1 μm, and the average pore diameter is 4.3 μm. In the inner wall of the cell structure formed by macropores and mesopores, micro concave/convex portions having undefined shapes were observed (concave/convex portions of the surface of the framework structure portion of FIG. 9). For the micro concave/convex portion of the inner wall surface of the cell, the pore diameter obtained by the nitrogen adsorption method is in a range of 2 to 80 nm, and it was possible to define the portion as non-continuous micropores having an average pore diameter of 20 nm. Moreover, the total pore volume was 5.0 mL/g, and BET specific surface area was 64 m²/g.

Examples 3-2 to 3-4

(Manufacturing of Organic Porous Material)

The organic porous material was manufactured in the same manner as in Example 3-1 except that charge amounts of styrene, divinylbenzene, n-heptane, sorbitan monooleate, and asobisisobutylonitrile were changed to values shown in Table 1. Results are put together in Table 2. In every case, the organic porous material had the cell structure shown in FIG. 9, the introduction of micropores was confirmed, and large values of BET specific surface area were obtained.

Reference Example 1

The organic porous material was manufactured in a method similar to that of Example 3-4 except that n-heptane was not added and the addition amount of sorbitan monooleate was changed to the value shown in Table 1. Results are shown in Table 2. In this reference example, the BET specific surface area of the organic porous material was no more than about ⅙ that of the organic porous material of Example 3-4, and the presence of micropores was not recognized.

TABLE 1

| | Styrene (g) | Divinyl benzene (g) | Sorbitan monooleate (g) | n-heptane (g) | AIBN (g) | Water (mL) |
|---|---|---|---|---|---|---|
| Ex. 3-1 | 32.91 | 17.72 | 8.04 | 21.7 | 0.29 | 450 |
| Ex. 3-2 | 40.50 | 10.13 | 4.44 | 33.7 | 0.20 | 450 |
| Ex. 3-3 | 40.50 | 10.13 | 8.04 | 21.7 | 0.20 | 450 |
| Ex. 3-4 | 45.57 | 5.06 | 4.44 | 33.7 | 0.15 | 450 |
| Ref. Ex. 3-1 | 45.57 | 5.06 | 5.63 | 0 | 0.15 | 450 |

TABLE 2

| | Mesopores average pore diameter (μm) | Micropores average pore diameter (nm) | Total pore volume (mL/g) | BET specific surface area (m²/g) |
|---|---|---|---|---|
| Example 3-1 | 4.3 | 20 | 5.0 | 64 |
| Example 3-2 | 4.5 | 30 | 8.6 | 47 |
| Example 3-3 | 4.3 | 20 | 5.8 | 46 |
| Example 3-4 | 5.8 | 30 | 9.6 | 38 |
| Reference Example 3-1 | 5.0 | None | 8.0 | 6 |

It is seen from Tables 1 and 2 that the organic porous materials of Examples 3-1 to 3-4 indicate BET specific surface areas six to ten times as large as the surface area of the organic porous material of the reference example in which the precipitant is not added.

Example 3-5

(Manufacturing of Organic Porous Ion Exchanger)

After the organic porous material manufactured in Example 3-4 was cut, 11.5 g of the material was picked up, and 800 mL of dichloroethane was added thereto. The mixture was heated at 60° C. for 30 minutes, and cooled to room temperature. Afterward, 59.1 g of chlorosulfuric acid was gradually added thereto, and reaction was carried out at room temperature for 12 hours. Thereafter, acetic acid was added, the reactants were projected into a large amount of water, rinsed, and dried, and a porous cationic exchanger was obtained. It was confirmed that the ion exchange capacity of the porous material was 4.4 mg equivalent/g in terms of the dry porous material and that the sulfonic acid groups were uniformly introduced into the porous material by using EPMA to map sulfur. Moreover, the inner structure of the organic porous ion exchanges include the open cell structure, most of macropores having an average diameter of 40 μm overlapped with one another, the average value of diameters of mesopores formed by the overlap of the macropores is 5.0 μm, the total pore volume was 8.2 mL/g, and BET specific surface area was 36 m²/g. The average value of diameters of micropores was 480 nm.

Example 3-6

(Use of Organic Porous Material as Adsorbent)

The organic porous material manufactured in Example 3-1 was cut in a square column shape having a bottom surface of 10 mm×10 mm and a height of 30 mm, and was filled into a square column having a bottom surface of 10 mm×10 mm and a height of 30 mm. One liter of 2 ethyl 1 hexanol aqueous solution having a concentration of 100 μg/L was supplied to the column at a speed of 50 mL/minute, the aqueous solution passed through the column was recovered, and 2 ethyl 1 hexanol concentration was measured. As a result, it was confirmed that the 2 ethyl 1 hexanol concentration in the aqueous solution effluent from the column was 1 μg/L or less and the organic porous material of the present example could quantitatively adsorb/remove 2 ethyl 1 hexanol.

As clearly seen from the above description, the organic porous materials and organic porous ion exchangers of the present invention have large pore volumes and specific surface areas, and are further superior in permeability of gas or liquid. Therefore, the present invention is useful as a filter, adsorbent, substitute for the existing ion exchange resin, filler as a substitute for the desalination module of the electrodeionization water purification device, filler for each type chromatography, solid acid, or base catalyst, and can be applied to a broad range of use field.

The invention claimed is:

1. A method for manufacturing a porous ion exchanger having many macropores therein, comprising the steps of:
    mixing an oil-soluble monomer, a precipitant which is a poor solvent with respect to a polymer obtained by polymerizing the oil-soluble monomer and which dissolves the oil-soluble monomer, a surface-active agent, and water to form a water-in-oil type emulsion in which water droplets are dispersed in an oil phase;
    polymerizing the monomer in the water-in-oil type emulsion to form a porous material; and
    introducing an ion exchange group into the formed porous material to manufacture the ion exchanger including an open cell structure in which the macropores are interconnected via mesopores and an average diameter of the mesopores is in a range of 1 to 1000 μm, and further including micropores as a non-continuous pores having an average pore diameter of 5 to 800 nm and existing on inner walls which define the respective pores.

2. The method of claim 1, wherein the polymerizing step uses a polymerization initiator selected from a group consisting of asobisisobutyronitrile, benzoyl peroxide, and potassium persulfate.

3. The method of claim 2, wherein the water-in-oil type emulsion is heated at 30 to 100 degrees centigrade for 1 to 48 hours in a sealed container in an inert atmosphere.

4. The method of claim 1, wherein the polymerizing step uses a polymerization initiator selected from a group consisting of hydrogen peroxide-iron chloride and sodium persulfate-acid sulphite sodium.

5. The method of claim 4, wherein the water-in-oil type emulsion is heated at 0 to 30 degrees centigrade for 1 to 48 hours in a sealed container under an inert atmosphere.

* * * * *